(12) United States Patent  (10) Patent No.: US 8,743,381 B2
Matsusaka  (45) Date of Patent: Jun. 3, 2014

(54) IMAGE FORMING APPARATUS AND DISPLAY METHOD FOR A DISPLAY PORTION OF AN IMAGE FORMING APPARATUS

(75) Inventor: Tetsuya Matsusaka, Osaka (JP)

(73) Assignee: Kyocera Document Solutions Inc., Osaka (JP)

( * ) Notice: Subject to any disclaimer, the term of this patent is extended or adjusted under 35 U.S.C. 154(b) by 149 days.

(21) Appl. No.: 13/115,279

(22) Filed: May 25, 2011

(65) Prior Publication Data

US 2011/0292432 A1    Dec. 1, 2011

(30) Foreign Application Priority Data

May 31, 2010 (JP) ................... 2010-124390

(51) Int. Cl.
- *G06F 15/00* (2006.01)
- *G06F 3/12* (2006.01)
- *G06K 1/00* (2006.01)
- *G06F 15/02* (2006.01)
- *G06F 3/02* (2006.01)
- *H04N 1/00* (2006.01)

(52) U.S. Cl.
CPC ............. *G06F 15/0225* (2013.01); *G06F 3/02* (2013.01); *H04N 2201/0094* (2013.01); *H04N 1/00411* (2013.01)
USPC .......................................... 358/1.13; 358/1.1

(58) Field of Classification Search
CPC ................ G06F 15/00225; G06F 3/02; H04N 2201/0094; H04N 1/00411
USPC .................................. 358/1.2, 1.13, 1.14, 1.15
See application file for complete search history.

(56) References Cited

U.S. PATENT DOCUMENTS

| 2008/0074683 A1* | 3/2008 | Yanamura et al. ............. 358/1.2 |
| 2008/0140307 A1* | 6/2008 | Chen et al. .................... 701/200 |
| 2008/0320390 A1* | 12/2008 | Semple et al. ................ 715/700 |
| 2009/0319694 A1* | 12/2009 | Slezak et al. .................... 710/10 |

FOREIGN PATENT DOCUMENTS

JP    2006-239969    9/2006

* cited by examiner

*Primary Examiner* — Douglas Tran
(74) *Attorney, Agent, or Firm* — Smith, Gambrell & Russell LLP.

(57) ABSTRACT

Provided is an image forming apparatus including: a connection portion for performing communication with a keyboard; and a display portion for performing displaying of disabled keys when the keyboard is connected to the connection portion, the disabled keys being unusable keys among keys provided to the keyboard.

18 Claims, 13 Drawing Sheets

Address Book

| No. | Name | Detail |
|---|---|---|
| ☐ 9995 | Technology Head Office | 816-6764-6666 |
| ☑ 9996 | KYOCERA MITA | 816-6764-7777 |
| ☑ 9997 | KYOCERA MITA2 | aaaa@kyocera |
| ☐ 9998 | KYOCERA MITA3 | 816-6764-5555 |
| ☐ | | |

[A-C] [D-F] [G-I] [J-L] [M-O] [P-S] [T-V] [W-Z] [0-9] ~KG1

[✉E-mail] [📁Folder] [📞FAX] [🌐i-FAX] ~KG2  [Cancel] [OK]

F1, 11, 12, B1, Detail

ADDRESS BOOK  REGISTRATION/EDIT

· DESTINATION NAME
abcdef    K1 ~ [EDIT]

· FAX NUMBER
           K2 ~ [EDIT]

· ADDRESS NUMBER
0001     K3 ~ [EDIT]

· F T P
           K4 ~ [EDIT]

· S M B
           K5 ~ [EDIT]

· E-MAIL ADDRESS
abc@def.com  [EDIT]
              K6

[NEW] [CANCEL] [REGISTER]

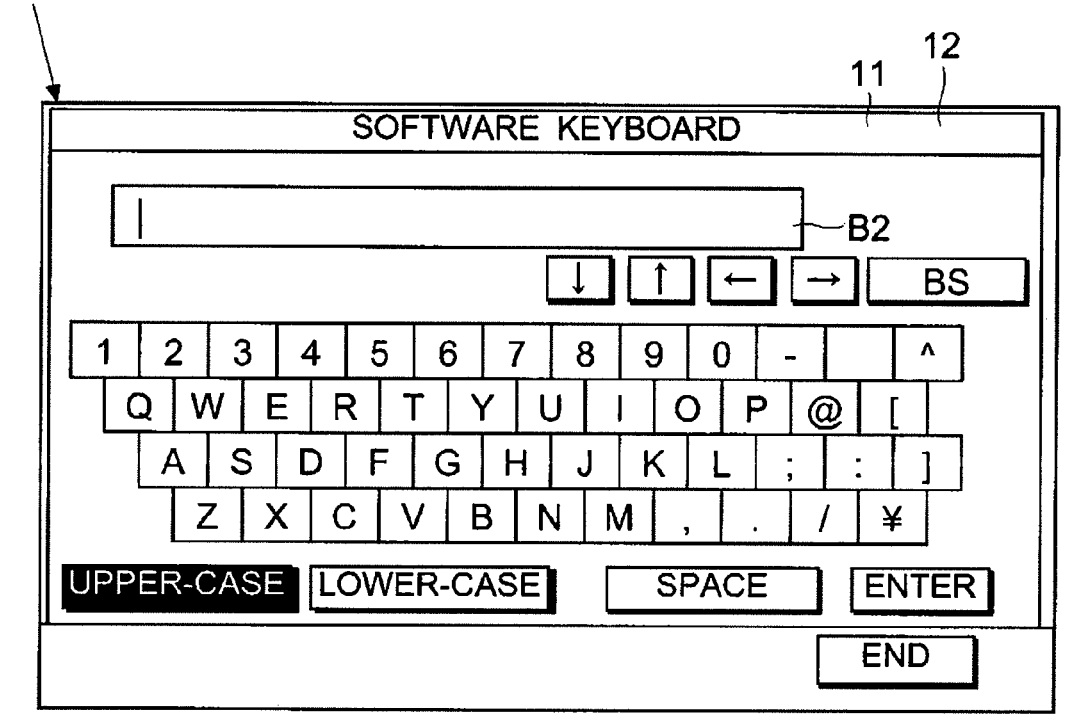

KEYBOARD DISPLAY SETTING — B3  11  12

- DISABLED-KEY DISPLAY TIME PERIOD [ 2 ] SECONDS
  (1 TO 10 SECONDS)
- COUNT OF DEPRESSIONS BEFORE DISPLAYING OF DISABLED KEYS IS PERFORMED

CB1 — ☑ ACTUAL COUNT [ 1 ] TIMES (1to99 TIMES)
                              B4
CB2 — ☐ FREQUENCY [ 3 ] TIMES (1to99 TIMES) [ ] PER MINUTES (1TO10)
                       B6                    B5

☐ DISPLAY WHEN POWER IS TURNED ON (WHEN CONNECTED)
☐ DISPLAY WHEN RECOVERED FROM POWER SAVING MODE (WHEN CONNECTED)
☐ ALWAYS DISPLAY KEYBOARD (WHEN CONNECTED)

[CANCEL] [REGISTER]

IMAGE FORMING APPARATUS AND DISPLAY METHOD FOR A DISPLAY PORTION OF AN IMAGE FORMING APPARATUS

This application is based upon and claims the benefit of priority from the corresponding Japanese Patent Application No. 2010-124390 filed on May 31, 2010, the entire contents of which are incorporated herein by reference.

BACKGROUND OF THE INVENTION

1. Field of the Invention

The present invention relates to an image forming apparatus, such as a copier, a multifunction peripheral, a printer, or a fax machine, which is provided with a display portion, such as a liquid crystal panel, and a connection portion (interface) for connection to a keyboard.

2. Description of Related Art

For example, in such image forming apparatuses as copiers and multifunction peripherals, it is sometimes necessary to input characters, symbols, and the like so as to input, for example, a password. Thus, in order to improve convenience at the time of inputting characters and the like, for example, a USB keyboard may be connected to the image forming apparatus, and the image forming apparatus may receive an input of characters and the like made by using the USB keyboard.

For example, there is known an image forming apparatus which includes processing means built in the apparatus, for performing image forming processing based on image data and a controller for controlling a USB device connectable via a USB interface, and which runs a plurality of application programs including an application installed in the controller for performing the image forming processing, in accordance with a required processing condition, and controls the processing means and the USB device to thereby execute processing. In the image forming apparatus, the controller creates a correspondence table that stores information indicating a correspondence between device class information defining the USB device and the application program used for the device, and includes means for updating the information of the correspondence table every time the USB device is connected and managing the information. This configuration is intended to realize, based on an existing technology, a user-friendly input support without difficulty in, for example, inputting a password, even when a user interface function provided to the image forming apparatus is poor.

As described above, when a password input or the like is used in the image forming apparatus, the user may input characters, symbols, numerals, and the like. In recent years, image forming apparatuses such as multifunction peripherals have been provided with such a display portion that has a touch panel (operation panel). Then, for example, the image forming apparatus displays a software keyboard on the display portion so as to receive an input of characters and the like. However, depending on the size of the display portion, each key of the software keyboard may be displayed small. As a result, there occurs such a problem that two or more keys are pressed simultaneously. To address this, as described above, such image forming apparatuses that allow an input of characters and the like to be performed from a connected keyboard are available.

By the way, a keyboard commonly available in the market (for example, USB keyboard) is intended for a personal computer. However, the image forming apparatus is different from the personal computer. Accordingly, the keyboard intended for the personal computer includes such keys that are unnecessary when used for the image forming apparatus (for example, function keys, control keys, and the like). The image forming apparatus only needs to recognize the depression of keys necessary for inputting characters and the like. Then, even if a signal generated when an unnecessary key is pressed is transmitted from the keyboard to the image forming apparatus, the image forming apparatus side ignores the signal. In other words, among the keys of the keyboard, the image forming apparatus handles unnecessary keys as disabled keys.

However, which key is usable and which key is unusable on the keyboard connected to the image forming apparatus are determined by how the image forming apparatus handles a signal transmitted from the keyboard. Thus, there is a problem that a user cannot know which key is usable and which key is unusable. Consequently, the user may perform a needless input operation of pressing an unusable key many times. Hence, there is a problem in respect to usability of the keyboard connected to the image forming apparatus.

Here, the above-mentioned publicly-known technology is intended to provide support in inputting a password or the like even with a poor user interface (UI). However, the publicly-known technology does not take into consideration a case where an unusable key is pressed on the keyboard. Further, for example, confirmation is not made as to whether or not the key is usable, and hence even when a special keyboard is connected, the user may mistakenly recognize that the keyboard is recognized normally by the image forming apparatus.

SUMMARY OF THE INVENTION

In view of the above-mentioned problems, the present invention has an object to improve usability for a user in inputting characters on an image forming apparatus by showing the user unusable keys of a keyboard connected to the image forming apparatus, thereby allowing the user to recognize effective keys (usable keys).

In order to solve the above-mentioned problems, an image forming apparatus according to an aspect of the present invention includes: a connection portion to be connected to a keyboard, for performing communication with the keyboard; and a display portion for performing displaying of disabled keys when the keyboard is connected to the connection portion, the disabled keys being unusable keys among keys provided to the keyboard.

With this configuration, it is possible to show the user the unusable keys of the keyboard connected to the image forming apparatus, thereby allowing the user to recognize the usable keys. Therefore, it is possible to provide the image forming apparatus that offers improved usability for the user in inputting characters and the like on the connected keyboard.

Further features and advantages of the present invention will become apparent from the description of embodiments given below.

BRIEF DESCRIPTION OF THE DRAWINGS

FIG. 4 is an explanatory diagram illustrating an example of an address book screen used for the multifunction peripheral according to the first embodiment.

FIG. 5 is an explanatory diagram illustrating an example of a transmission destination information registration screen according to the first embodiment.

FIG. 6 is an explanatory diagram illustrating an example of a software keyboard according to the first embodiment.

FIG. 7 is an explanatory diagram illustrating an example of a user registration screen according to the first embodiment.

FIG. 11 is an explanatory diagram illustrating an example of a keyboard display setting screen according to the first embodiment.

DETAILED DESCRIPTION OF PREFERRED EMBODIMENTS

Hereinbelow, a first embodiment is described with reference to FIGS. 1 to 11. Here, in this embodiment, described as an example is a multifunction peripheral 100 (corresponding to an image forming apparatus) including an operation panel 1. Note that, such elements as configuration and layout described in this embodiment are provided merely by way of example, and not by way of limitation.

(Outline of Image Forming Apparatus)

Figure 1:
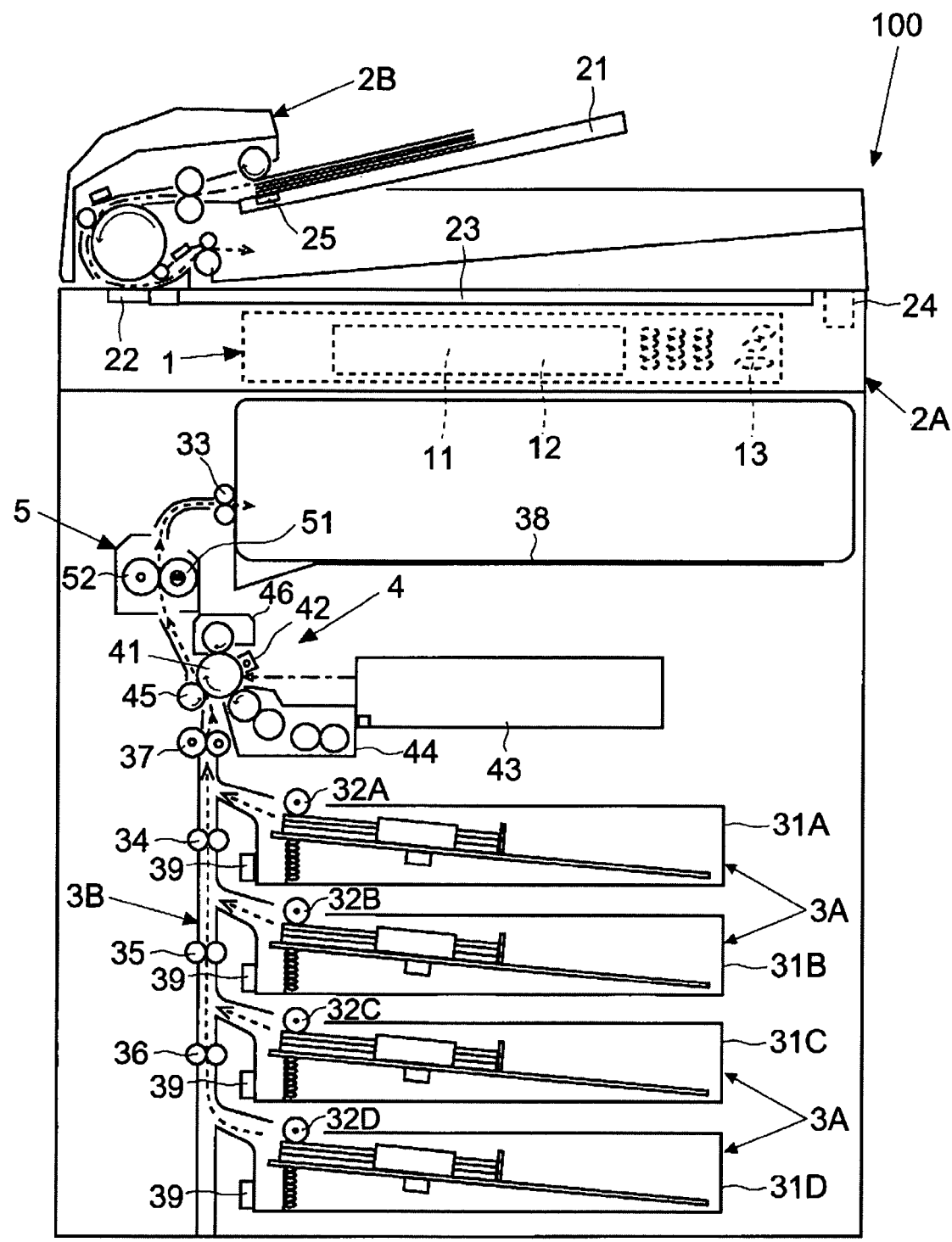
FIG. 1 is a sectional front view schematically illustrating an example of an image forming apparatus according to a first embodiment.

First, referring to FIG. 1, an outline of the multifunction peripheral 100 according to the first embodiment is described. FIG. 1 is a sectional front view schematically illustrating an example of the image forming apparatus of the first embodiment.

As illustrated in FIG. 1, the operation panel 1 used for making various settings and performing input is provided in an upper front of the multifunction peripheral 100 (illustrated by broken lines: details thereof are described later). Further, an image reading portion 2A and a document conveying device 2B are provided in an upper portion of the multifunction peripheral 100. Further, the multifunction peripheral 100 includes, inside a main body thereof, a sheet feeding portion 3A, a conveyance path 3B, an image forming portion 4, a fixing portion 5, and the like.

The operation panel 1 is provided with a liquid crystal display portion 11 (corresponding to a display portion) for displaying a state of the multifunction peripheral 100 and various messages. The liquid crystal display portion 11 is capable of displaying one or a plurality of keys used for selecting or setting a function, inputting characters, etc. Further, a transparent touch panel portion 12 (for example, a resistive type, corresponding to an input portion) is provided on a top surface of the liquid crystal display portion 11. The touch panel portion 12 is used for detecting the position and coordinates of a pressed part on the liquid crystal display portion 11. Further, the operation panel 1 is also provided with various hard keys, including, for example, a start key 13 for giving an instruction to start executing various functions, such as copying.

The document conveying device 2B includes a document tray 21, on which documents to be read are placed. Then, the document conveying device 2B automatically conveys the documents continuously one by one from the document tray 21 to a reading position (contact glass 22 for feed reading). Further, the document conveying device 2B is mounted to the image reading portion 2A so as to be openable/closable in a vertical direction with a depth-direction side of the document conveying device 2B in the drawing sheet of FIG. 1 as a point of support. The document conveying device 2B functions as a cover that press, from above, contact glasses (the contact glass 22 for feed reading and a contact glass 23 for placement reading) of the image reading portion 2A.

As illustrated in FIG. 1, the image reading portion 2A includes, in a top surface thereof, the contact glass 22 for feed reading and the contact glass 23 for placement reading, on which a document is placed when such a document as a book is read one sheet by one sheet. In the image reading portion 2A, a lamp, a mirror, a lens, an image sensor, etc. (not shown) are disposed. Based on light reflected from a document passing by the contact glass 22 for feed reading or light reflected from a document placed on the contact glass 23 for placement reading, the image sensor reads the document. Then, the image sensor converts the reflected light to an analog electrical signal in accordance with an image density, and subsequently performs quantization. As a result, image data on the document is obtained. The multifunction peripheral 100 is capable of printing based on the image data obtained by the reading (copy function). Note that, the image reading portion 2A of this embodiment is capable of both color reading and black-and-white reading.

The sheet feeding portion 3A accommodates a plurality of sheets (for example, copy paper, plain paper, recycled paper, cardboard, or various sheets such as OHP sheets), and feeds sheets one by one to the conveyance path 3B. The sheet feeding portion 3A includes a plurality of cassettes 31 in which accommodated sheets are placed (in FIG. 1, denoted by 31A, 31B, 31C, and 31D in order from above). Further, there are provided sheet feeding rollers 32 that are rotationally driven to feed sheets from the cassettes 31 to the conveyance path 3B (in FIG. 1, denoted by 32A, 32B, 32C, and 32D in order from above). For example, at the time of printing, any one of the sheet feeding rollers 32 is rotationally driven, to thereby feed sheets one by one to the conveyance path 3B.

The conveyance path 3B is a path for conveying a sheet fed from the sheet feeding portion 3A. Note that, the image forming portion 4, the fixing portion 5, and the like are disposed along the sheet conveyance path. Further, the conveyance path 3B is provided with a guide for guiding sheets. Further, the conveyance path 3B is provided with conveying roller pairs 33 to 36 that are rotationally driven when a sheet is conveyed. Further, the conveyance path 3B is provided with a registration roller pair 37 for holding a conveyed sheet in front of the image forming portion 4 and feeding the sheet in synchronization with a timing at which a toner image is formed.

The image forming portion 4 forms a toner image based on the image data, and then transfers the toner image onto the conveyed sheet. For that purpose, the image forming portion 4 includes a photosensitive drum 41, which is supported so as to be rotationally driven in an arrow direction illustrated in FIG. 1, and a charging device 42, an exposure device 43, a developing device 44, a transfer roller 45, a cleaning device 46, and the like, which are arranged around the photosensitive drum 41.

Description is given of toner image formation and a transfer process. The photosensitive drum 41 that is rotationally driven in a predetermined direction is provided substantially at the center of the image forming portion 4. In FIG. 1, the charging device 42 provided obliquely to the upper right of the photosensitive drum 41 charges the photosensitive drum 41 to a predetermined potential. In FIG. 1, the exposure device 43 is provided on a right-hand side of the charging device 42. The exposure device 43 emits laser beams based on the image data, and subjects a surface of the photosensitive drum 41 to scanning exposure, thereby forming an electrostatic latent image in accordance with the image data. Note that, examples of the image data used herein include image data obtained by the image reading portion 2A and image data transmitted from an external computer 200 connected via, for example, a network or from a communication partner's fax machine 300 (see FIG. 3).

Then, in FIG. 1, the developing device 44 provided obliquely to the lower right of the photosensitive drum 41 supplies toner to the electrostatic latent image formed on the photosensitive drum 41, thereby performing development. The transfer roller 45 provided on a left-hand side of the photosensitive drum 41 is in press-contact with the photosensitive drum 41, thereby forming a nip portion. Then, the sheet is advanced into the nip portion at a timing synchronized with the toner image. When the sheet is advanced thereinto, a predetermined voltage is applied to the transfer roller 45, and the toner image formed on the photosensitive drum 41 is transferred onto the sheet. The cleaning device 46 removes toner left on the photosensitive drum 41 after the transfer.

The fixing portion 5 fixes the toner image that has been transferred onto the sheet. The fixing portion 5 of this embodiment is configured by a heating roller 51 embedded mainly with a heating element and a pressure roller 52. The heating roller 51 and the pressure roller 52 are in press-contact with each other, thereby forming a nip portion. Then, when the sheet passes through the nip portion, the toner on the surface of the sheet is fused/heated, and consequently, the toner image is fixed on the sheet. The sheet having the toner fixed thereon is delivered to a delivery tray 38. In this manner, image formation (printing) at the time of using the copy function and a printer function is performed.

(Operation Panel 1)

Figure 2:
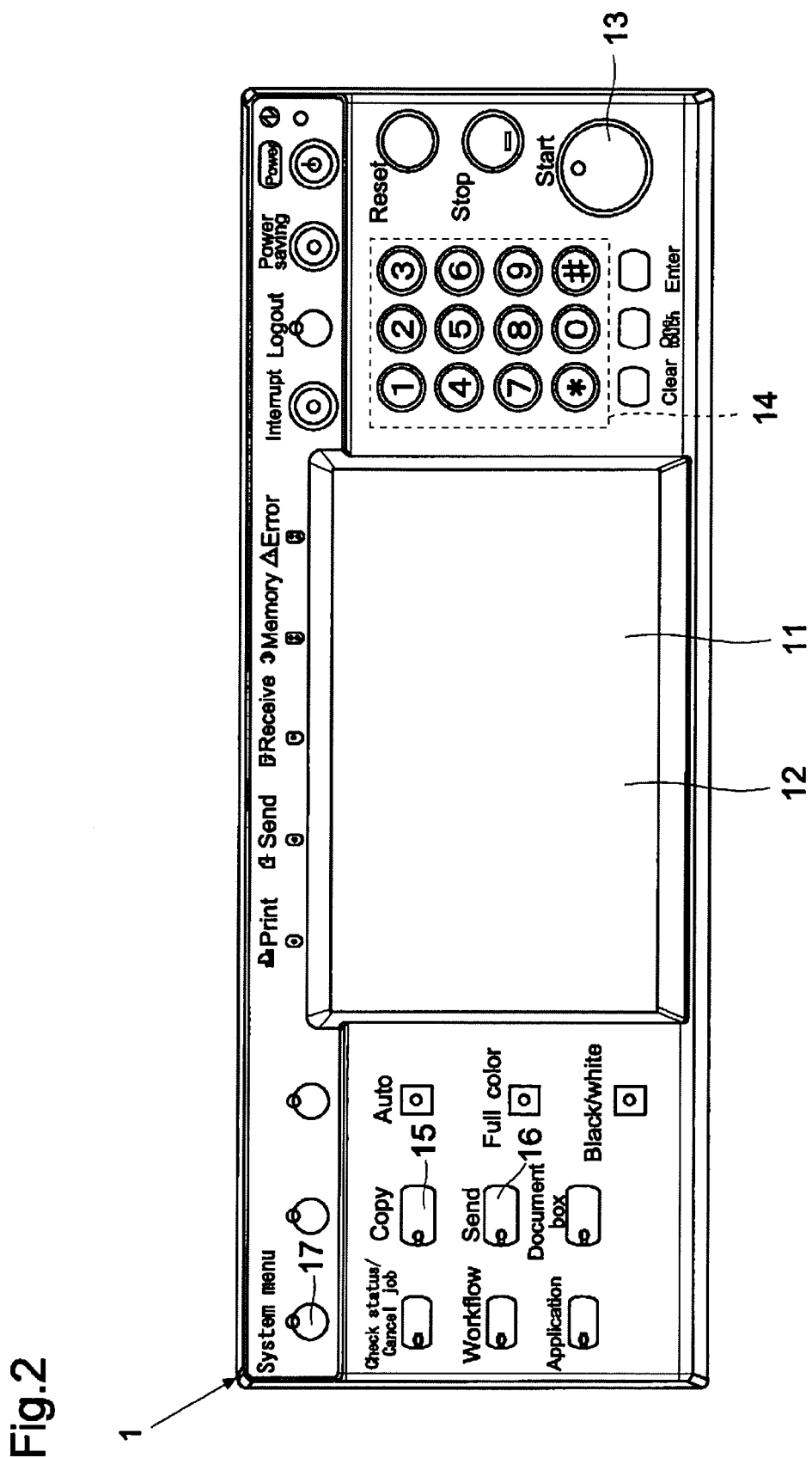
FIG. 2 is a plan view illustrating an example of an operation panel according to the first embodiment.

Next, referring to FIG. 2, description is given of an example of the operation panel 1 according to the first embodiment. FIG. 2 is a plan view illustrating an example of the operation panel 1 according to the first embodiment.

As illustrated in FIG. 1, the operation panel 1 is provided in the upper front of the multifunction peripheral 100. The operation panel 1 includes the liquid crystal display portion 11 for displaying a screen and various images, such as menus and keys (see FIG. 4 and the like) used for making settings of the multifunction peripheral 100 and giving operation instructions, and a message regarding the state of the multifunction peripheral 100. A user presses the keys displayed on the liquid crystal display portion 11, to thereby make various settings about the multifunction peripheral 100 and give operation instructions.

Further, the touch panel portion 12 is provided on the top surface of the liquid crystal display portion 11. The touch panel portion 12 is used for detecting the position and coordinates of a part pressed by the user. By comparing the coordinates detected by the touch panel portion 12 to the positions and coordinates of various keys displayed on the liquid crystal display portion 11, the key pressed by the user is identified. Note that, the touch panel portion 12 is not particularly limited, and thus can employ various types, such as a resistive type, a surface acoustic wave type, an infrared type, and a capacitive type.

Further, the operation panel 1 is provided with the following hard keys (buttons). For example, there are provided the start key 13 for giving an instruction to start such a job as copying after various settings are made, a numeric keypad portion 14 for inputting numerals, and the like. Further, there are provided, for example, a copy key 15 to be pressed when the copy function is used and a send key 16 to be pressed when a scanner function or a fax function is used. Further, a system menu key 17 to be pressed, for example, when an address book is registered is provided on an upper left of the operation panel 1. As described above, the operation panel 1 includes the touch panel portion 12 and various hard keys. The touch panel portion 12 and the various hard keys function as the input portion used for making various settings, selecting modes, and performing other operations with regard to respective functions of the multifunction peripheral 100.

(Hardware Configuration of Multifunction Peripheral 100 and the Like)

Figure 3:
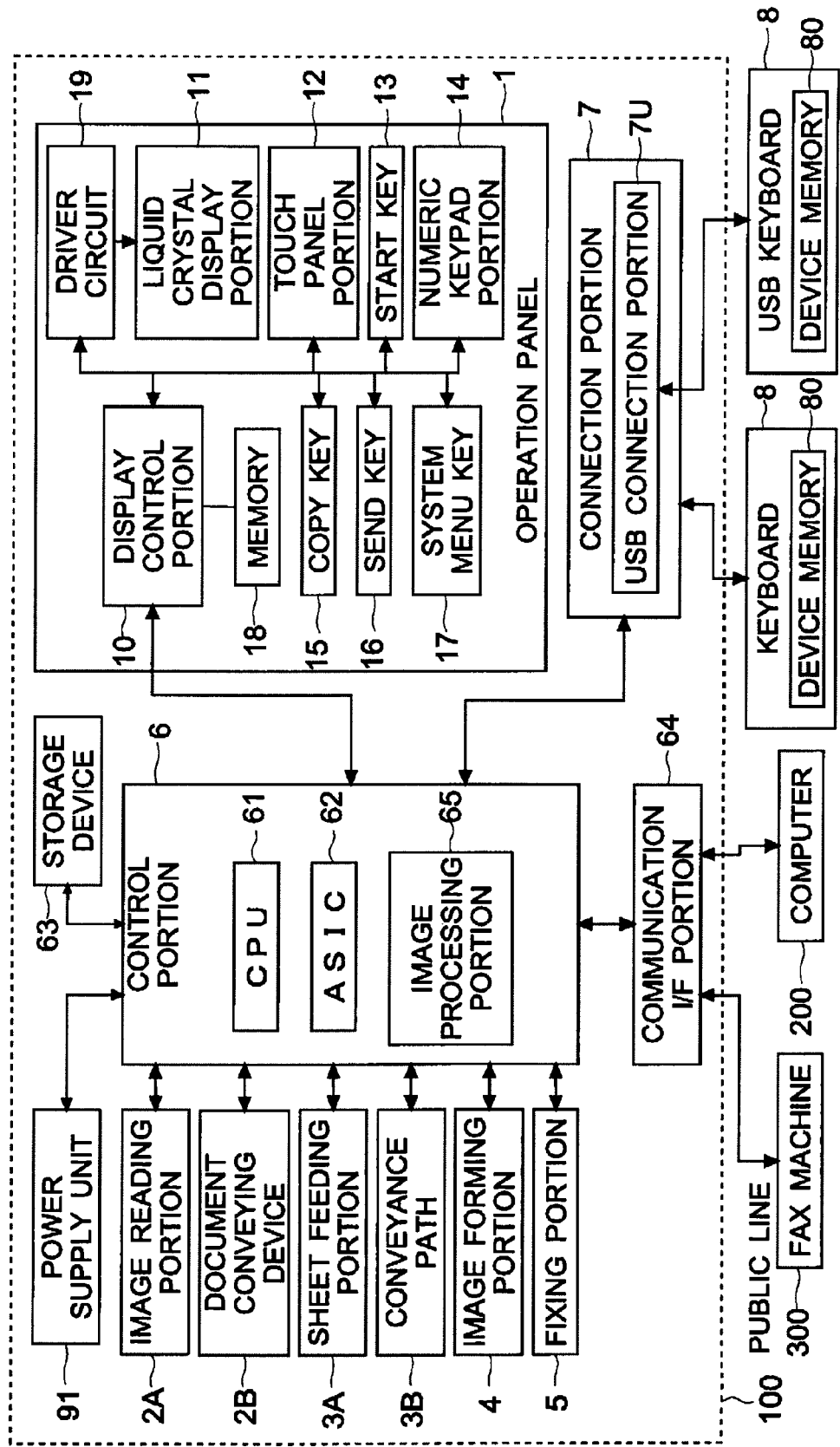
FIG. 3 is a block diagram illustrating an example of a hardware configuration of a multifunction peripheral of the first embodiment.

Next, referring to FIG. 3, description is given of an example of a hardware configuration of the multifunction peripheral 100 according to the first embodiment. FIG. 3 is a block diagram illustrating an example of the hardware configuration of the multifunction peripheral 100 according to the first embodiment.

First, a control portion 6 is provided inside the main body of the multifunction peripheral 100. For example, the control portion 6 is connected to the operation panel 1, the image reading portion 2A, the document conveying device 2B, the sheet feeding portion 3A, the conveyance path 3B, the image forming portion 4, the fixing portion 5, and the like, and controls those components.

The control portion 6 includes, for example, a CPU 61 and such an element as an ASIC 62 being a dedicated circuit for performing processing in the multifunction peripheral 100. The CPU 61 performs computation or the like in accordance with a control program, which is stored in a storage device 63 and is to be loaded therefrom, thereby controlling respective portions of the multifunction peripheral 100. Note that, as the control portion 6, a plurality of kinds of control portions may be provided depending on the function. For example, such control portions may include a main control portion that performs overall control and image processing, and an engine control portion that controls printing by, for example, performing image formation and turning ON/OFF motors or the like that cause various rotational bodies to rotate. In this specification, description is given by presenting such a form that those control portions are integrated as the one control portion 6.

The storage device 63 is connected to the control portion 6. The storage device 63 is configured by combining a ROM, a RAM, a HDD, and the like. The storage device 63 can store various pieces of data, including a control program, control data, and setting data of the multifunction peripheral 100, and image data on a document read by the image reading portion 2A.

Further, the control portion 6 is connected to an interface portion for communication (hereinafter, referred to as communication I/F portion 64) provided with various connectors, sockets, a fax modem, and the like. The communication I/F portion 64 is connected to a plurality of external computers 200 (for example, personal computers) and to the communication partner's fax machine 300 (in FIG. 3, only one external computer 200 and one fax machine 300 are illustrated for the sake of convenience) via a network, a public line, or the like. For example, image data obtained by the image reading portion 2A can be stored in the storage device 63, or the image data can be transmitted to the external computer 200 or the communication partner's fax machine 300 (the scanner function and the fax function). Further, it is also possible to perform printing, fax transmission, and the like based on image data that has been input to the multifunction peripheral 100 through the transmission from the external computer 200 or the communication partner's fax machine 300 (the printer function and the fax function).

Further, the control portion 6 recognizes an input made to the operation panel 1, and controls the multifunction peripheral 100 so as to perform copying or the like in accordance with the settings made by the user. For example, when such a setting has been made, via the operation panel 1, that copying is performed by specifying the sheet feeding portion 3A to be used, the control portion 6 causes the specified sheet feeding portion 3A to feed a sheet. Further, the control portion 6 causes image data to be transmitted from the communication I/F portion 64 to a transmission destination specified via the operation panel 1.

Further, for example, the control portion 6 includes an image processing portion 65. The image processing portion 65 performs image processing on image data obtained by reading a document by the image reading portion 2A or on image data input to the multifunction peripheral 100 via the communication I/F portion 64. For example, image data processed by the image processing portion 65 is transmitted to the exposure device 43, which then uses the image data when subjecting the photosensitive drum 41 to scanning/exposure, or is transmitted to the communication I/F portion 64 so as to be sent to an outside.

The operation panel 1 of this embodiment includes a display control portion 10, a memory 18, a driver circuit 19, the liquid crystal display portion 11, and the touch panel portion 12. The display control portion 10 is constituted by a CPU, an IC, and the like. The display control portion 10 controls displaying of the liquid crystal display portion 11, and receives an output from the touch panel portion 12, to thereby identify the coordinates at which the liquid crystal display portion 11 (touch panel portion 12) is pressed. The memory 18 stores data such as a table indicating a correspondence between the output from the touch panel portion 12 and the coordinates. The display control portion 10 compares the coordinates of a pressed position and image data of the corresponding setting screen to each other, to thereby identify and recognize a key selected (pressed) on the setting screen.

Specifically, in order to select a setting item and set a setting value for each function of the multifunction peripheral 100, selecting a key displayed on the liquid crystal display portion 11 is repeated from a topmost layer. Every time a key is selected, the display control portion 10 causes the liquid crystal display portion 11 to switch its display. Then, eventually, the setting value is set for the function that the user intends to select and set. The display control portion 10 recognizes that this function has been selected and set. The display control portion 10 transmits a setting content to the control portion 6 in the main body. By doing so, the control portion 6 causes the respective portions, such as the image forming portion 4, to perform an operation that reflects the function selected and set via the operation panel 1. Thus, the intention of the user is reflected in printing, transmission, and the like (for example, density setting, enlargement/reduction, etc.).

Further, image data of screens and images to be displayed by the liquid crystal display portion 11 is stored in, for example, the memory 18 of the operation panel 1. Accordingly, every time a key is pressed in a selection screen for the setting item or each setting screen, the display control portion 10 reads image data of a screen to be displayed next from the memory 18.

Alternatively, the image data of screens and images to be displayed by the liquid crystal display portion 11 may be stored in, for example, the storage device 63 on the main body side. In this case, the operation panel 1 receives the image data that is to be used for a display by the liquid crystal display portion 11 from the storage device 63 via the control portion 6. The display control portion 10 sends the image data of screens and images to the driver circuit 19 that actually controls displaying of the liquid crystal screen. Note that, the display control portion 10 and the memory 18 do not need to be provided to the operation panel 1, and instead, the configuration (the CPU 61 and the storage device 63) of the control portion 6 or the like may be used for the functions of the display control portion 10 and the memory 18.

(Connection and Recognition of Keyboard 8)

Next, referring to FIG. 3, description is given of an example of connection of a keyboard 8 to a connection portion 7 according to the first embodiment.

As illustrated in FIG. 3, the connection portion 7 is provided to the multifunction peripheral 100 of this embodiment. Further, the keyboard 8 can be connected to the connection portion 7. The keyboard 8 to be connected is, for example, a keyboard 8 compliant with the USB standard.

Thus, the connection portion 7 includes a USB connection portion 7U for a USB device. Further, the USB connection portion 7U includes a host controller, a USB driver, a memory, host software, and a USB bus interface such as a connector, and is constituted by, for example, a chip or a circuit board. Further, the user can input characters or the like by using a USB keyboard 8 (details thereof are described later).

Note that, the USB device connectable to the connection portion 7 is, for example, a USB flash drive (not shown), which is a portable memory. For example, the multifunction peripheral 100 can load data (for example, in PDF or JPEG format) or the like stored in the USB flash drive, and then store the data in the storage device 63 or perform printing.

Further, the USB keyboard 8 includes, inside thereof, a device memory 80 (for example, semiconductor ROM). In the case of the USB keyboard 8, the device memory 80 stores data called "descriptor". For example, when the USB flash drive, the USB keyboard 8, or the like is connected to the USB connection portion 7U, the USB connection portion 7U performs communication with the USB flash drive or the keyboard 8, to thereby obtain the descriptor stored in the USB flash drive or the device memory 80 of the USB keyboard 8.

Specifically, when a given period of time has elapsed (for example, 100 ms) after the USB keyboard 8 is connected to the connection portion 7, the connection portion 7 performs communication with the USB keyboard 8. For example, the connection portion 7 assigns an address to the USB keyboard 8, and obtains the descriptor from the USB keyboard 8. Then, based on class information indicating a type of the USB device and such other information contained in the descriptor, the control portion 6 and the connection portion 7 recognize that the connected device is the USB keyboard 8.

With this, the control portion 6 of the multifunction peripheral 100 recognizes what kind of USB device is connected to the USB connection portion 7U. Note that, the descriptor includes various pieces of information, such as a vendor ID, a product ID, a device attribute, and the class information. It is assumed that the descriptor is compliant with the USB standard and thus described in accordance with the standard. Hence, hereinbelow, description of the descriptor is herein omitted except for a case in which the descriptor needs to be described particularly.

Further, a keyboard 8 other than the USB-compliant keyboard may be connected to the connection portion 7. To that end, apart from the USB connection portion 7U, the connection portion 7 may include a connector for connecting to the keyboard 8, and a driver, a controller, software, and the like for performing communication with the keyboard 8. For example, a keyboard 8 compliant with, for example, the Bluetooth standard may be communicably connected. Thus, the connection portion 7 may include a communication chip, a driver, and the like so as to be compliant with the Bluetooth standard. Then, if the connected keyboard 8, which is not compliant with the USB standard, includes a device memory 80 storing information indicating details of the keyboard 8 (information corresponding to the descriptor of the USB standard), the connection portion 7 obtains the information indicating the details of the keyboard 8 from the device memory 80.

(Input of Characters or the Like on Multifunction Peripheral 100)

Next, referring to FIGS. 4 to 7, description is given of an example of a case where characters or the like need to be input on the multifunction peripheral 100 according to the first embodiment. FIG. 4 is an explanatory diagram illustrating an example of an address book screen S1 used for the multifunction peripheral 100 according to the first embodiment. FIG. 5 is an explanatory diagram illustrating an example of a transmission destination information registration screen S2 according to the first embodiment. FIG. 6 is an explanatory diagram illustrating an example of a software keyboard SK according to the first embodiment. FIG. 7 is an explanatory diagram illustrating an example of a user registration screen S3 according to the first embodiment.

The multifunction peripheral 100 of this embodiment is capable of transmitting and accumulating pieces of image data of documents read by using the image reading portion 2A. In such a case, the transmission destination (destination to save) of the image data needs to be specified. In order to avoid inputting an address and the like every time the transmission is performed, the multifunction peripheral 100 of this embodiment stores, as the address book, transmission destination information (a destination name, a destination address, etc.) in the storage device 63 or the memory 18. Then, the liquid crystal display portion 11 displays the address book. For example, the display control portion 10 obtains the transmission destination information from the storage device 63 via the control portion 6 or reads the transmission destination information from the memory 18, and then causes the liquid crystal display portion 11 to display the transmission destination information.

Specifically, FIG. 4 illustrates an example of the address book screen S1. For example, when the send key 16 is pressed, the liquid crystal display portion 11 displays the address book screen S1 illustrated in FIG. 4. The liquid crystal display portion 11 displays, on the address book screen S1, a list of pieces of transmission destination information stored in the storage device 63 or the memory 18.

The pieces of transmission destination information are displayed in a list display area F1 of the address book screen S1. The storage device 63 and the memory 18 of the multifunction peripheral 100 of this embodiment are each capable of storing at least several thousand pieces of transmission destination information. Hence, in some cases, the list display area F1 cannot display all the pieces of transmission destination information. Accordingly, a scroll bar B1 is provided on the right-hand side of the list display area F1. When the scroll bar B1 is pressed, the liquid crystal display portion 11 switches pieces of transmission destination information displayed in the list display area F1.

Further, below the list display area F1, there is provided a first narrow-down key group KG1 for narrowing down pieces of transmission destination information by the destination name. Moreover, there is provided a second narrow-down key group KG2 for narrowing down pieces of transmission destination information by a registered transmission method. The first narrow-down key group KG1 includes keys and the like for narrowing down pieces of transmission destination information by the initial character of the destination name in units of a plurality of characters of the alphabet. Further, the second narrow-down key group KG2 includes keys for narrowing down pieces of transmission destination information by the transmission method (e-mail, fax, etc.). The display control portion 10 narrows down pieces of transmission destination information under a condition corresponding to the pressed narrow-down key, and then displays the narrowed-down pieces of transmission destination information on the liquid crystal display portion 11.

In order to display pieces of transmission destination information as a list on the address book screen S1 as described above, it is necessary to register the pieces of transmission destination information in the storage device 63 or the memory 18 in advance. Thus, FIG. 5 illustrates an example of the transmission destination information registration screen S2, which is a screen for registering and inputting the transmission destination information.

For example, when the system menu key 17 or the like is pressed, the liquid crystal display portion 11 displays the transmission destination information registration screen S2. Items that can be registered as the transmission destination information include the destination name, an address number (serial number), a fax number, SMB, FTP, and an e-mail address. When one of edit keys K1 to K6 disposed to the right of the respective items is pressed, the liquid crystal display portion 11 displays the software keyboard SK illustrated in FIG. 6, and the touch panel portion 12 or the like receives an input regarding the software keyboard SK or each item. Further, a device connected to the connection portion 7, such as the USB keyboard 8, may be used to perform an input. Then, an input result is displayed below each item name.

Further, the software keyboard SK is provided with an input result display field B2 for showing an input result as illustrated in FIG. 6. Every time a key is pressed by the user, the liquid crystal display portion 11 displays, in the input result display field B2, an alphabet character, a symbol, or a numeral corresponding to the pressed key.

Note that, the user presses the edit key K5 of the SMB item, to thereby input a host name of the computer 200 being a transmission destination, an IP address of the computer 200, a path of a folder being a save destination, or the like. Further, the user presses the edit key K6 of the FTP item, to thereby input a host name of an FTP server, an IP address of the FTP server, a path of a file to be saved, or the like.

Further, as illustrated in FIG. 7, the multifunction peripheral 100 of this embodiment also allows registering a user of the multifunction peripheral 100. For example, when the system menu key 17 or a key displayed on the liquid crystal display portion 11 is pressed, the liquid crystal display portion 11 displays the user registration screen S3. For example, items that can be registered as user information include a user name, a login user name (login ID), a login password, an access level, a department, an e-mail address, and a network address.

When one of edit keys K8 to K14 disposed to the right of the respective items is pressed, as in the case of the registration of the transmission destination information, the liquid crystal display portion 11 displays the software keyboard SK illustrated in FIG. 6, and the touch panel portion 12 or the like receives an input on the software keyboard SK or an input regarding each item. Further, a device connected to the connection portion 7, such as the USB keyboard 8, may be used to perform an input.

Similarly to the case of the transmission destination information, the user information may be stored in the storage device 63 or the memory 18. Then, for example, before the multifunction peripheral 100 is used, the liquid crystal display portion 11 requests an input of the login user name or the login password. This enables verifying a person who desires to use the copy or transmission function, and thus enables the user to be identified. Identifying the user provides a benefit in terms of security against the use of the multifunction peripheral 100 by an unauthorized person. In addition, for example, it is possible to grasp the usage by each user (for example, grasp the number of printed sheets).

As described above, with the multifunction peripheral 100 of this embodiment, there is a case where characters, numerals, symbols, and the like need to be input for, for example, the destination name or the e-mail address when the transmission destination information or the user information is registered. Accordingly, when characters and the like need to be input, the liquid crystal display portion 11 displays the software keyboard SK (see FIG. 6), and the user can input characters and the like by performing an input on the liquid crystal display portion 11 and the touch panel portion 12.

In this case, a signal indicating a key pressed on the software keyboard SK is transmitted from the touch panel portion 12 to the display control portion 10. Then, the display control portion 10 recognizes the pressed key. Further, the display control portion 10 causes the liquid crystal display portion 11 to perform a display corresponding to the pressed key.

Further, for an input of characters or the like, the USB keyboard 8 or the like may be connected to the connection portion 7 for the input. There is a typical case where each key of the software keyboard SK is made small depending on the size of the liquid crystal display portion 11. For example, there is a tendency that a smaller liquid crystal display portion 11 is mounted as the price becomes lower. Further, some users may feel comfortable in using the USB keyboard 8 or the like. In view of the above, the multifunction peripheral 100 of this embodiment allows such a device as the USB keyboard 8 to be connected to the connection portion 7 and thus be used for performing an input.

In this case, a signal (scan code) indicating a key pressed on the keyboard 8 is transmitted from the keyboard 8 to the connection portion 7. For example, the storage device 63 stores in advance data for recognizing which one of the characters, symbols, and numerals corresponds to the received scan code (keyboard driver software). Then, based on the data from the connection portion 7, the control portion 6 recognizes the pressed key. Further, the control portion 6 transmits data indicating the pressed key to the operation panel 1, and the operation panel 1 handles the data by regarding the data as data that has been input by pressing a key on the keyboard 8. The display control portion 10 causes the liquid crystal display portion 11 to perform a display corresponding to the pressed key (an input result such as a character is displayed).

(Outline of Displaying of Disabled Keys)

Figure 8:
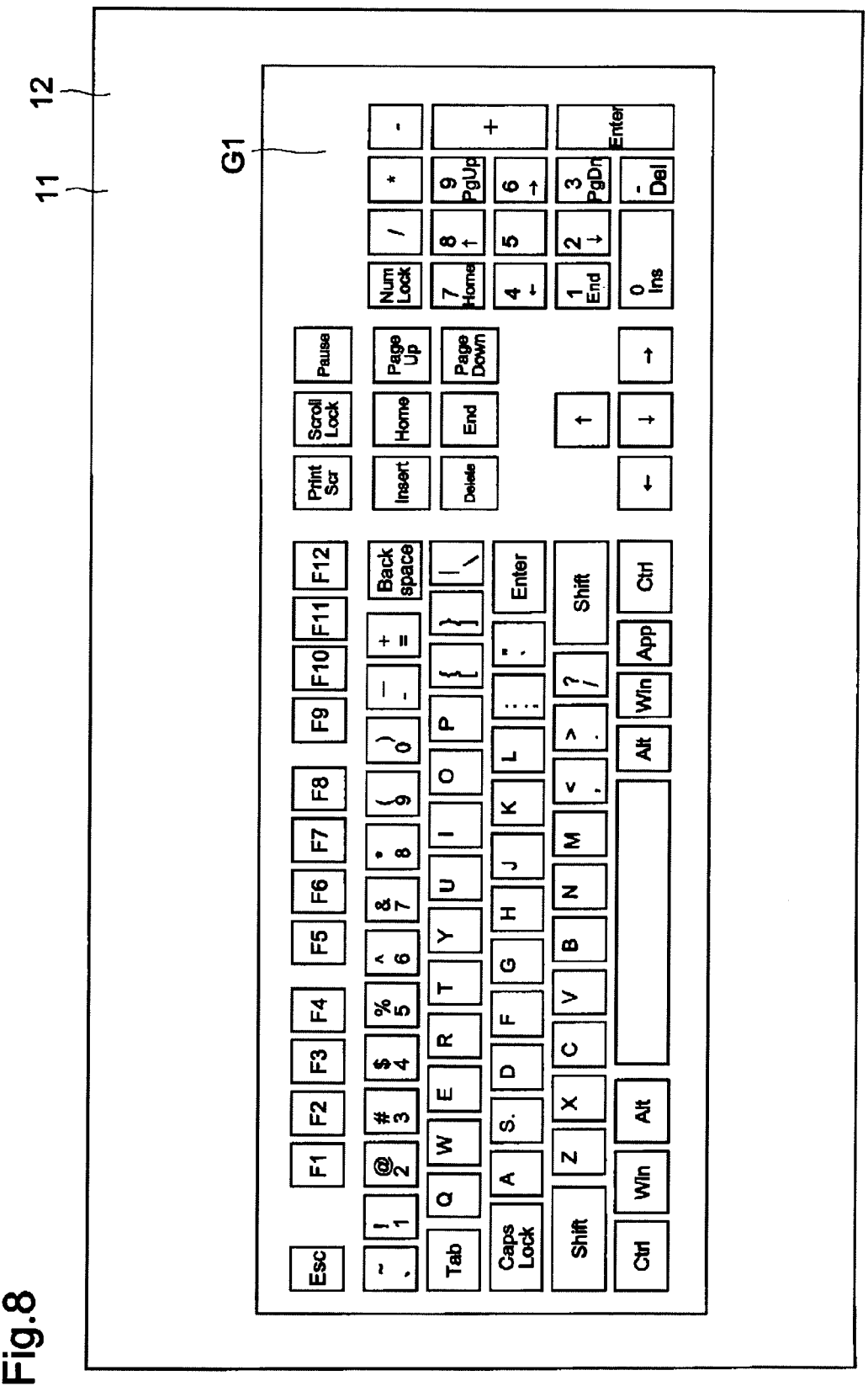
FIG. 8 is an explanatory diagram illustrating an example of a keyboard image displayed on the multifunction peripheral according to the first embodiment when a keyboard is connected.
Figure 9:
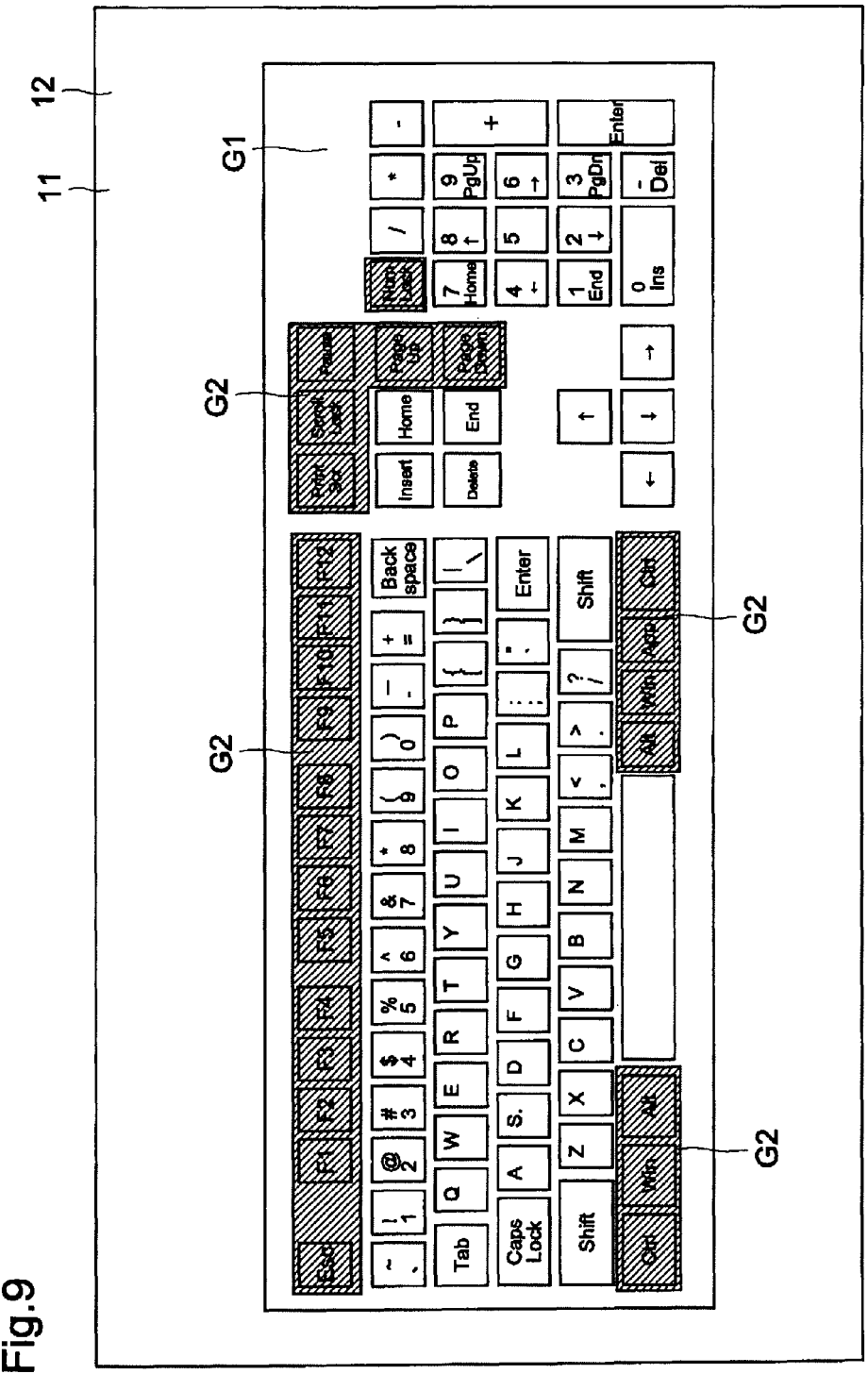
FIG. 9 is an explanatory diagram illustrating an example of displaying of disabled keys in a keyboard image according to the first embodiment.

Next, referring to FIGS. 8 and 9, description is given of an outline of displaying of disabled keys in the multifunction peripheral 100 according to the first embodiment. FIG. 8 is an explanatory diagram illustrating an example of a keyboard image G1 displayed on the multifunction peripheral 100 according to the first embodiment when the keyboard 8 is connected. FIG. 9 is an explanatory diagram illustrating an example of displaying of disabled keys in the keyboard image G1 according to the first embodiment.

As described above, the multifunction peripheral 100 according to embodiments of the present invention allows the keyboard 8 to be connected to the connection portion 7. Further, when an input of a character, a numeral, a symbol, or the like is performed through the connected keyboard 8, the multifunction peripheral 100 receives the input. Further, as illustrated in FIG. 8, the liquid crystal display portion 11 of the operation panel 1 can display the keyboard image G1 indicating the keyboard 8 when the keyboard 8 is connected to the connection portion 7. The keyboard image G1 is an image that represents the keyboard. Note that, FIG. 8 illustrates an example of a case where the keyboard 8 for a personal computer is connected, and the keyboard image G1 therefor is displayed on the liquid crystal display portion 11. Because the keyboard image G1 is displayed, the user can understand that the keyboard 8 is recognized by the multifunction peripheral 100.

Further, FIG. 9 illustrates an example of the displaying of the disabled keys performed by the liquid crystal display portion 11. A keyboard 8 commonly available in the market is intended for the personal computer, and thus includes keys that are unnecessary in using the multifunction peripheral 100. Hence, for example, when a disabled key has been pressed on the keyboard 8 connected to the connection portion 7, the liquid crystal display portion 11 performs the displaying of the disabled keys.

For example, a function key is assigned some function depending on each application of the personal computer. In other words, the function key is sometimes pressed as a shortcut key for a function executable on the application. However, with the multifunction peripheral 100, there is no need to assign functions to respective function keys. Hence, the function keys on the keyboard 8 are unnecessary in inputting characters or the like on the multifunction peripheral 100.

In view of the above, as illustrated in FIG. 9, the liquid crystal display portion 11 performs such a display that function key parts on the keyboard 8 are hatched (modified display images G2). With the hatching, the liquid crystal display portion 11 indicates the disabled keys (displaying of disabled keys). Further, similarly, for example, the print screen key, the scroll lock key, the pause key, the control key, the alt key, the Windows key, and the like on the keyboard 8 are unnecessary in inputting characters or the like on the multifunction peripheral 100. Thus, with respect to those keys, too, the liquid crystal display portion 11 displays the modified display images G2 in which the keys are hatched, thereby indicating that those keys are disabled (displaying of disabled keys).

Here, FIG. 9 illustrates an example in which the disabled keys are displayed on the liquid crystal display portion 11 with the hatching. However, for example, different display colors may be used between the disabled key (for example, red) and the enabled key (for example, black), thereby performing the displaying of the disabled keys by the color. Further, for example, the displaying of the disabled keys may be performed by displaying the hatching with a color, such as displaying the hatching in red.

(Display Control of Disabled Keys)

Figure 10:
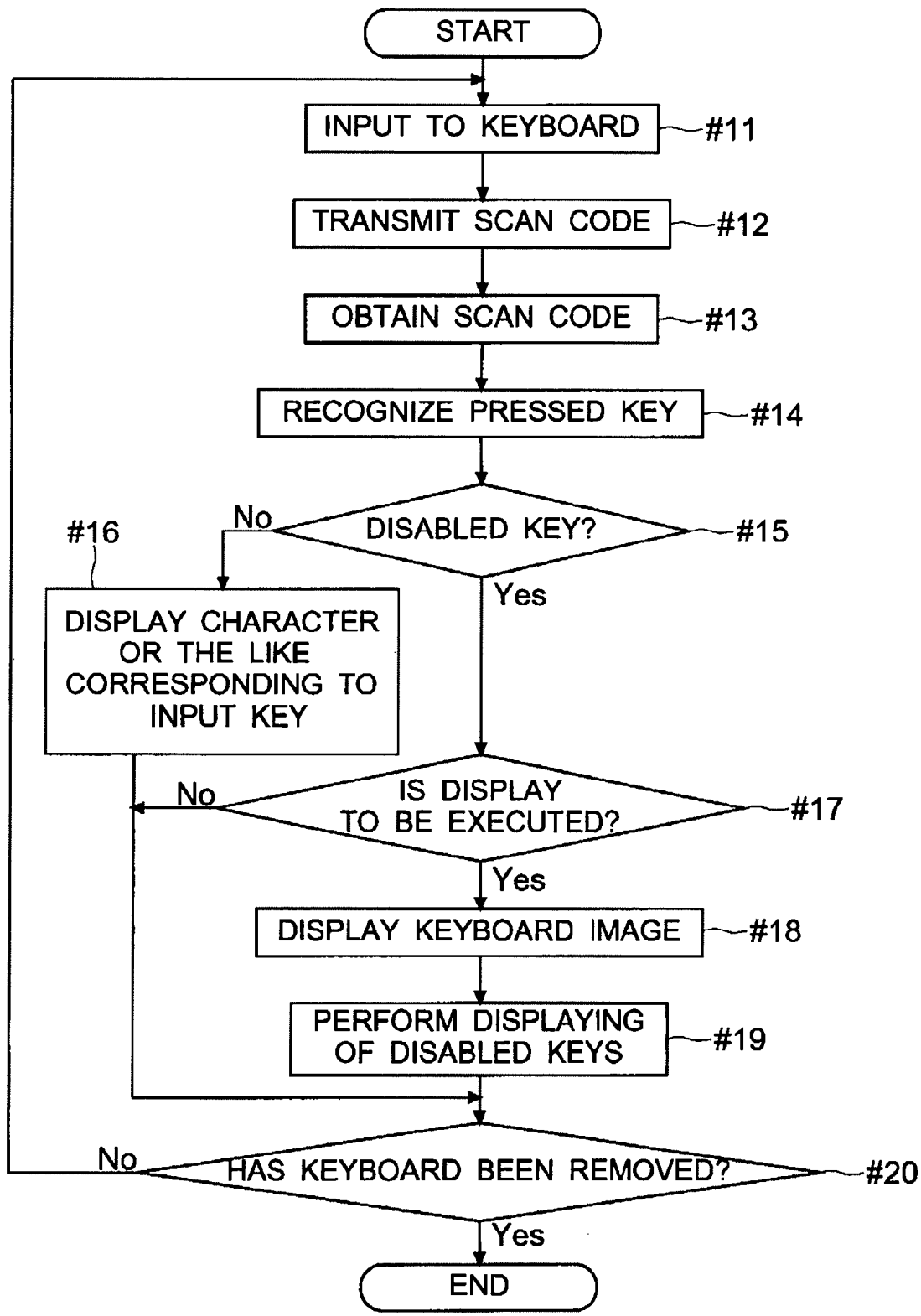
FIG. 10 is a flow chart illustrating an example of display control performed in the multifunction peripheral according to the first embodiment when the keyboard is connected.

Next, referring to FIGS. 10 to 11, description is given of an example of display control performed in the multifunction peripheral 100 according to the first embodiment when the keyboard 8 is connected. FIG. 10 is a flow chart illustrating an example of the display control performed in the multifunction peripheral 100 according to the first embodiment when the keyboard 8 is connected. FIG. 11 is an explanatory diagram illustrating an example of a keyboard display setting screen S4 according to the embodiments of the present invention.

Note that, in this embodiment, description is given of an example in which the displaying of the disabled keys is performed when the disabled key is pressed on the keyboard 8. In other words, description is given of an example in which the liquid crystal display portion 11 performs the displaying of the disabled keys in response to a disabled key having been pressed.

First, at a time point of start illustrated in FIG. 10, the keyboard 8 such as the USB keyboard is already connected to the connection portion 7. Further, the control portion 6 and the connection portion 7 have already recognized that the keyboard 8 is connected. The start of FIG. 10 is a time point at which the user attempts to input characters or the like, such as the user name, the destination name, or the e-mail address. In this case, in a state in which the keyboard image G1 is not displayed and the displaying of the disabled keys is not performed, the liquid crystal display portion 11 displays the software keyboard SK illustrated in FIG. 6 by default.

Then, the user performs an input on the keyboard 8 (Step #11). In response, the keyboard 8 transmits the scan code (value assigned to each key of the keyboard 8) corresponding to the key pressed on the keyboard 8 (Step #12). Subsequently, the connection portion 7 obtains the scan code from the keyboard 8 (Step #13). Further, the control portion 6 receives the scan code from the connection portion 7, to thereby recognize the key pressed on the keyboard 8 (Step #14).

For example, when the keyboard 8 connected to the connection portion 7 is the USB keyboard 8, the control portion 6 uses driver software for the USB keyboard 8 stored in the storage device 63, to thereby recognize which key has been pressed on the keyboard 8. In other words, the control portion 6 uses, for example, the driver software, to thereby identify the key corresponding to the received scan code. Note that, the storage device 63 may store pieces of driver software for USB keyboards 8 of respective countries, and the control portion 6 may select a piece of driver software for the USB keyboard 8 to be used, in accordance with a country code obtained from the USB keyboard 8. Note that, the country code is defined in "Device Class Definition for Human Interface Devices (HID) Version 1.11," which is one of the USB written standards. Further, this written standard is available for view at http://www.usb.org/developers/devclass_docs/HID1_11.pdf.

Subsequently, the control portion 6 checks whether or not the pressed key is categorized as the disabled key in the multifunction peripheral 100 (Step #15). When the pressed key is not the disabled key (No in Step #15), the control portion 6 causes a character, a numeral, or a symbol corresponding to the key input on the keyboard 8 to be displayed in the character input result display field (Step #16). On the other hand, when the pressed key is the disabled key (Yes in Step #15), the control portion 6 checks whether or not to perform the displaying of the disabled keys (Step #17).

Here, if the displaying of the disabled keys is performed for a long period of time or if the displaying of the disabled keys is performed too frequently while characters and the like are being input, the user may feel it frustrating. To address this, the multifunction peripheral 100 of this embodiment allows making settings about the displaying of the disabled keys, and, with reference to FIG. 11, description is given of setting of the displaying of the disabled keys.

The liquid crystal display portion 11 displays the keyboard display setting screen S4 illustrated in FIG. 11. For example, the keyboard display setting screen S4 can be reached by pressing, for example, the system menu key 17.

Further, the liquid crystal display portion 11 displays, in the keyboard display setting screen S4, a disabled-key display time period field B3 for setting a period of time during which the displaying of the disabled keys is performed. For example, the user presses the disabled-key display time period field B3. Then, when a numeral input has been performed on the numeric keypad portion 14, the liquid crystal display portion 11 of the operation panel 1 changes the disabled-key display time period field B3 in accordance with the input numeral. Subsequently, when a registration key has been pressed, the control portion 6 causes, for example, the memory 18 or the storage device 63 to store the period of time during which the displaying of the disabled keys is performed (setting value for display time period), so that the displaying of the disabled keys is performed using the period of time input in the disabled-key display time period field B3. In this manner, the user can set the period of time during which the displaying of the disabled keys is performed. Note that, FIG. 11 illustrates an example in which the displaying of the disabled keys is performed for two seconds. Note that, the disabled-key display time period (predetermined display time period) may be determined arbitrarily, but may be set to, for example, from one to five seconds, considering that the positions of the disabled keys only need to be checked.

Further, the liquid crystal display portion 11 performs, in the keyboard display setting screen S4, a display for setting how frequently the displaying of the disabled keys is performed when the disabled key is pressed on the keyboard 8. In other words, it is possible to determine how many times the disabled key needs to be pressed before the displaying of the disabled keys is performed. How frequently the displaying of the disabled keys is performed can be determined with reference to two kinds of criteria.

As a first criterion, an actual count of times the disabled key has been pressed on the keyboard 8 may be set as a criterion for how frequently the displaying of the disabled keys is performed. When the frequency is to be set by using, as the criterion, the actual count of times the disabled key has been pressed on the keyboard 8, the user presses a check box CB1 in the keyboard display setting screen S4. Then, the user presses a count display field B4 provided to the right of the check box CB1, and then inputs a numeral through the numeric keypad portion 14. Subsequently, the set count is transmitted to the control portion 6.

In response to this, the control portion 6 gives an instruction to the display control portion 10 so as to cause the liquid crystal display portion 11 to perform the displaying of the disabled keys when a total cumulative count of times the disabled key has been pressed on the keyboard 8 reaches the count input in the count display field B4. For example, in a case where "1" is input in the count display field B4, the liquid crystal display portion 11 performs the displaying of the disabled keys every time the disabled key is pressed on the keyboard 8. For example, in a case where "10" is input in the count display field B4, the liquid crystal display portion 11 performs the displaying of the disabled keys when the disabled key has been pressed on the keyboard 8 ten times.

Further, as a second criterion, a count of times the disabled key has been pressed on the keyboard 8 per unit time may be set as the criterion for how frequently the displaying of the disabled keys is performed. When the count of times the disabled key has been pressed per unit time is to be used as the criterion, the user presses a check box CB2 in the keyboard display setting screen S4. Then, the user presses a unit time field B5 provided to the right of the check box CB2 and a count display field B6 provided further to the right thereof, and then inputs a numeral through the numeric keypad portion 14. Subsequently, the set unit time and count are transmitted to, for example, the control portion 6.

In response to this, the control portion 6 gives an instruction to the display control portion 10 so as to cause the liquid crystal display portion 11 to perform the displaying of the disabled keys when a total cumulative count of times the disabled key has been pressed on the keyboard 8 per unit time specified in the unit time field B5 reaches the count input in the count display field B6. For example, in a case where "1" and "3" are input in the unit time field B5 and in the count display field B6, respectively, the control portion 6 causes the liquid crystal display portion 11 to perform the displaying of the disabled keys when the disabled key has been pressed on the keyboard 8 three times in one minute.

Then, when the registration key has been pressed in the keyboard display setting screen S4, the display control portion 10 causes the memory 18 or the storage device 63 to store the frequency thus input for performing the displaying of the disabled keys. As described above, in the multifunction peripheral 100 of this embodiment, it is possible to set how many times the disabled key needs to be pressed on the keyboard 8 before the displaying of the disabled keys is performed. This enables the user to set how frequently the displaying of the disabled keys is performed in accordance with his/her preference.

Thus, when the disabled key has been pressed through an input using the keyboard 8 (Yes in Step #15), the control portion 6 checks whether or not to cause the displaying of the disabled keys to be performed, by referring to the display frequency set in the keyboard display setting screen S4 (Step #17).

Then, when the condition for performing the displaying of the disabled keys is satisfied, and thus the displaying of the disabled keys is to be performed (Yes in Step #17), the control portion 6 gives an instruction to the display control portion 10 of the operation panel 1, and the display control portion 10 first causes the liquid crystal display portion 11 to display the keyboard image G1 (Step #18). Further, subsequently, the liquid crystal display portion 11 displays the modified display images G2, such as hatching, in parts of the keys of the keyboard image G1 corresponding to the disabled keys for the period of time set in the keyboard display setting screen S4, thereby performing the displaying of the disabled keys (Step #19).

On the other hand, when the key pressed on the keyboard 8 is not the disabled key (No in Step #15), when the displaying of the disabled keys is not to be performed despite the disabled key having been pressed (No in Step #17), or after Step #19, the control portion 6 checks whether or not the keyboard 8 has been removed from the connection portion 7 (Step #20). For example, when the connection portion 7 cannot communicate with the keyboard 8 any more, the control portion 6 can recognize that the keyboard 8 has been removed from the connection portion 7.

When the keyboard 8 has been removed (Yes in Step #20), this control may be terminated (end). On the other hand, when the keyboard 8 has not been removed (No in Step #20), for example, the flow returns to Step #11.

As described above, according to the first embodiment, the image forming apparatus (for example, multifunction peripheral 100) includes: the connection portion 7 to be connected to the keyboard 8, for performing communication with the keyboard 8; and the display portion (liquid crystal display portion 11) for performing the displaying of the disabled keys, which are unusable keys among the keys provided to the keyboard 8, when the keyboard 8 is connected to the connection portion 7. In other words, the image forming apparatus of this embodiment includes: the connection portion 7 to be connected to the keyboard 8, for performing communication with the keyboard 8; the display portion for performing the displaying; and the control portion 6 communicably connected to the connection portion 7, which recognizes the keyboard 8 being connected to the connection portion 7 and the key pressed on the keyboard 8 through the communication between the keyboard 8 and the connection portion 7, and when the keyboard 8 is connected to the connection portion 7, causes the display portion to perform the displaying of the disabled keys, which are unusable keys among the keys provided to the keyboard 8. This enables the user to recognize the unusable keys of the keyboard 8. Hence, when the user performs an input by connecting the keyboard 8 to the image forming apparatus, the user can know which key is usable and which key is unusable. As a result, it is possible to improve usability for the user in inputting characters through the keyboard 8.

Further, the display portion (liquid crystal display portion 11) performs the displaying of the disabled keys by displaying, at the time of the displaying of the disabled keys, the keyboard image G1 representing the keyboard 8 and then displaying the disabled keys of the keyboard image G1 in a modified manner (displaying the modified display images G2). This enables the user to check the modified positions in the keyboard image G1 and thus to grasp intuitively in what parts the keys or key groups are unusable. Further, because the keyboard image G1 is displayed, it is possible to show the user that the connected keyboard 8 is recognized. Therefore, the user can get an idea of the enabled keys, and grasp intuitively that the keyboard 8 is recognized by the image forming apparatus (for example, multifunction peripheral 100).

Further, the display portion (liquid crystal display portion 11) performs the modified displaying (displays the modified display images G2) by using the hatching and/or changing the display color. This enables the user to recognize intuitively that the disabled keys are hatched keys and/or keys displayed in a changed color. Therefore, the disabled keys are displayed in an easy-to-recognize manner.

Further, the display portion (liquid crystal display portion 11) performs the displaying of the disabled keys when the disabled key has been pressed on the keyboard 8. In other words, the control portion 6 recognizes that the disabled key has been pressed on the keyboard 8 by means of a signal received by the connection portion 7 from the keyboard 8. Then, when the disabled key has been pressed on the keyboard 8, the control portion 6 causes the display portion to perform the displaying of the disabled keys. With this, the displaying of the disabled keys is performed as a response to the disabled key having been pressed. Therefore, the user can recognize that the pressed key is disabled, and can thus learn easily which key is usable while performing an input.

Further, the display portion (liquid crystal display portion 11) performs the displaying of the disabled keys when the count of times the disabled key has been pressed exceeds a predetermined count. In other words, the control portion 6 recognizes that the disabled key has been pressed on the keyboard 8 by means of a signal received by the connection portion 7 from the keyboard 8. In addition, the control portion 6 recognizes the count of times the disabled key has been pressed, and when the count of times the disabled key has been pressed exceeds the predetermined count, causes the display portion to perform the displaying of the disabled keys. If the displaying of the disabled keys is performed frequently, some users feel it frustrating. To address this, when the count of times the disabled key has been pressed exceeds the predetermined count, the displaying of the disabled keys is performed. This allows the displaying of the disabled keys to be performed only when the count of times the disabled key has been pressed exceeds the predetermined count, that is, only when too many needless key inputs are observed. Therefore, when it is not very necessary to perform the displaying of the disabled keys, the displaying of the disabled keys is not performed, thereby preventing the user from feeling frustration.

Further, the display portion (liquid crystal display portion 11) performs the displaying of the disabled keys for the predetermined display time period. In other words, the control portion 6 causes the display portion to perform the displaying of the disabled keys for the predetermined display time period. This can prevent the disabled key from being kept displayed needlessly. Note that, the predetermined display time period may be determined arbitrarily, but may be set to, for example, one to five seconds, considering that the positions of the disabled keys only need to be checked.

Second Embodiment

Figure 12:
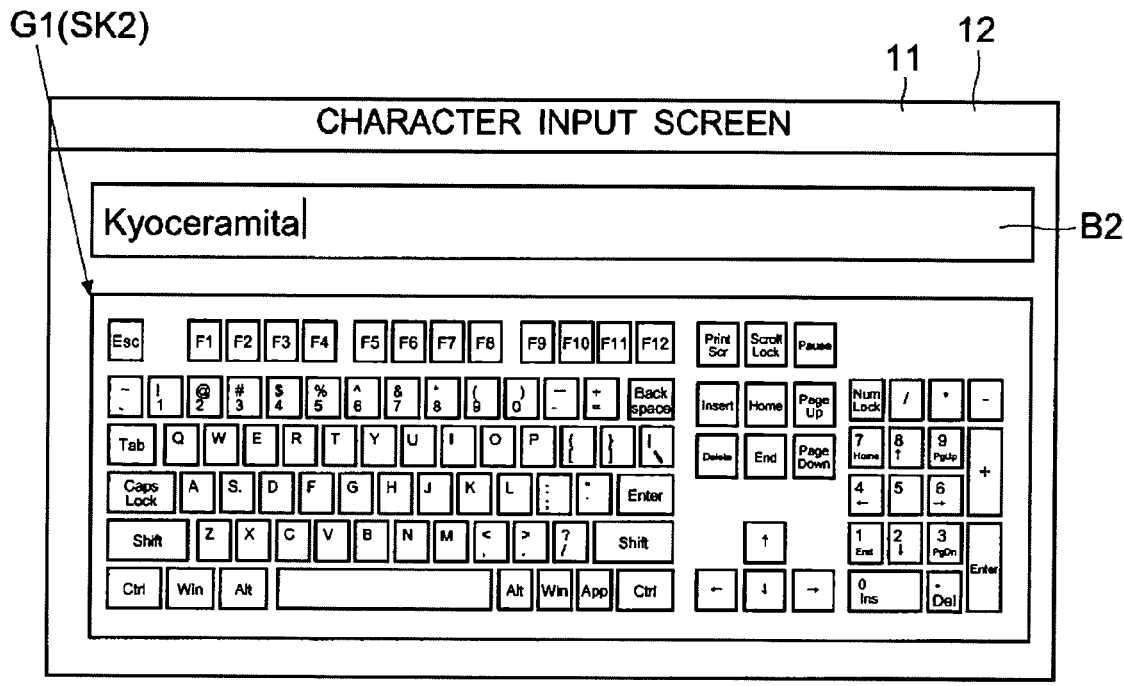
FIG. 12 is an explanatory diagram illustrating an example of a software keyboard displayed on a multifunction peripheral according to a second embodiment.
Figure 13:
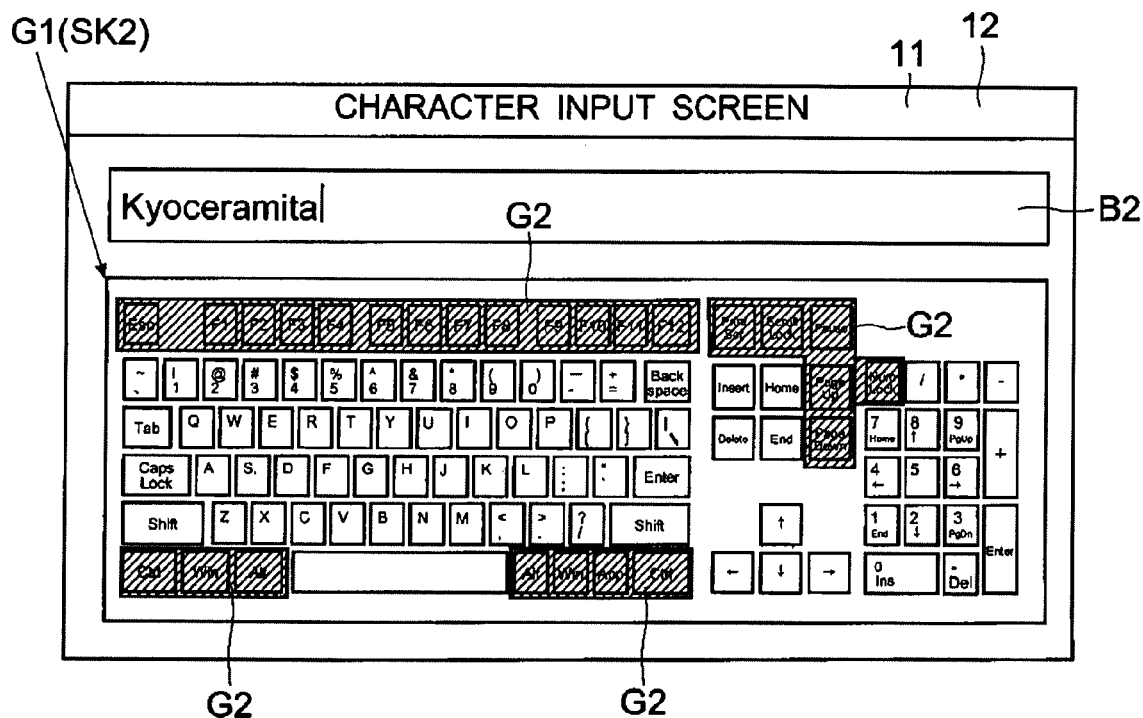
FIG. 13 is an explanatory diagram illustrating an example of a software keyboard displayed on the multifunction peripheral according to the second embodiment.

Next, referring to FIGS. 12 and 13, a second embodiment is described. FIGS. 12 and 13 are each an explanatory diagram illustrating an example of a software keyboard SK2 displayed on a multifunction peripheral 100 according to the second embodiment.

In the first embodiment, there has been given an example in which the software keyboard SK for inputting characters and the like is displayed in the state in which the keyboard 8 is connected to the multifunction peripheral 100. In the second embodiment, description is given of an example in which, the keyboard image G1 of the connected keyboard 8 is displayed as the software keyboard (software keyboard SK2).

Note that, points other than the following different point may be the same as in the first embodiment, and hence description and illustration of the points shared in common with the first embodiment are herein omitted.

In the multifunction peripheral 100 of this embodiment, if the keyboard 8 is connected at the time of inputting characters and the like, such as the destination name, as illustrated in FIG. 12, a software keyboard SK2 corresponding to the image of the connected keyboard 8 (keyboard image G1) is displayed instead of the default software keyboard SK (see FIG. 6). In other words, the keyboard image G1 is displayed as the software keyboard SK2.

In a state in which the software keyboard SK2 represented by the keyboard image G1 is displayed, characters and the like can be input by pressing respective displayed keys. In this case, for example, the display control portion 10 compares an output from the touch panel portion 12 to the keyboard image G1 displayed on the liquid crystal display portion 11 to grasp the pressed position, thereby identifying the pressed key. Note that, data indicating a correspondence between coordinates and a key is stored in, for example, the memory 18. Further, an input result display field B2 for showing an input result is provided, and the liquid crystal display portion 11 displays the input result in the input result display field B2.

Further, the user may also perform an input by using the keyboard 8 connected to the multifunction peripheral 100. When the disabled key has been pressed on the keyboard 8 connected to the multifunction peripheral 100, as illustrated in FIG. 13, the display control portion 10 causes the liquid crystal display portion 11 to perform the displaying of the disabled keys. Further, in this embodiment, the displaying of the disabled keys, in which the modified display images G2 are displayed, may be always performed while the keyboard image G1 is displayed as the software keyboard SK2.

As described above, in this embodiment, the multifunction peripheral 100 includes the input portion (touch panel portion 12) for receiving an input made by pressing the display portion (liquid crystal display portion 11), and the input portion receives an input of a key pressed on the keyboard image G1 displayed on the display portion. With this, the keyboard image G1 can be used as the software keyboard SK2 to be displayed on the display portion, thereby increasing options to be selected when the user performs an input.

Third Embodiment

Figure 14:
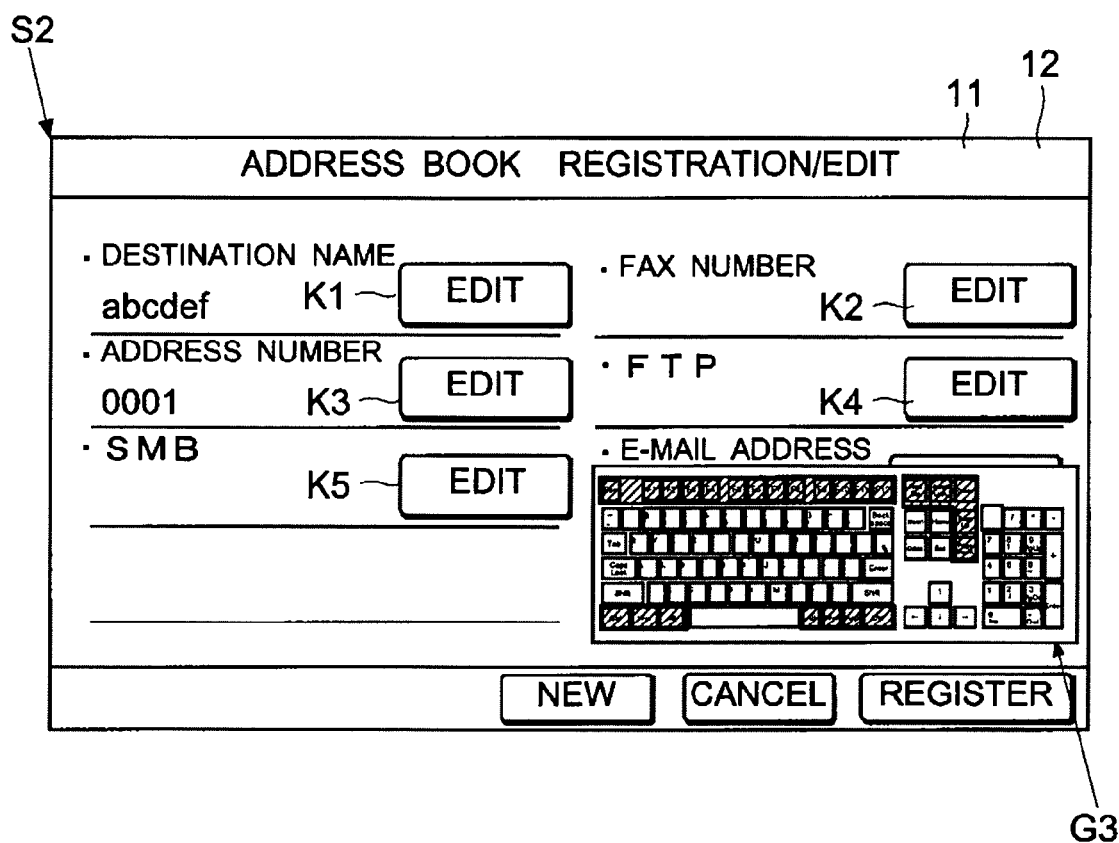
FIG. 14 is an explanatory diagram illustrating an example of a reduced keyboard image displayed on a multifunction peripheral according to a third embodiment.

Next, referring to FIG. 14, a third embodiment is described. FIG. 14 is an explanatory diagram illustrating an example of a reduced keyboard image G3 displayed on a multifunction peripheral 100 according to the third embodiment.

In the second embodiment, there has been given an example in which the keyboard image G1 of the connected keyboard 8 is displayed as the software keyboard SK2. This embodiment is different in that the keyboard image G1 is always displayed in the state in which the keyboard 8 is connected to the connection portion 7.

Note that, points other than the following different point may be the same as in the first and second embodiments, and hence description and illustration of the points shared in common with the first and second embodiments are herein omitted.

In this embodiment, when the keyboard 8 is connected to the connection portion 7, the keyboard image G1 is displayed. However, if the keyboard image is always displayed large, the keyboard image may sometimes become a nuisance. To address this, in the state in which the keyboard 8 is connected to the connection portion 7, as illustrated in FIG. 14, for example, the reduced keyboard image G3, which is obtained by reducing the keyboard image G1, may be always displayed as a kind of the keyboard image on a corner of the liquid crystal display portion 11, instead of the keyboard image G1.

For example, FIG. 14 illustrates the transmission destination information registration screen S2 described in the first embodiment. Then, in a part of the transmission destination information registration screen S2, the reduced keyboard image G3 obtained by reducing the keyboard image G1 is displayed as a separate window. In other words, the layer of the reduced keyboard image G3 is displayed in an overlapping manner on the layer of the transmission destination information registration screen S2. Further, the modified displaying may be employed for the disabled keys in the reduced keyboard image G3 as well.

Further, for example, by moving the reduced keyboard image G3 while pressing the reduced keyboard image G3 (dragging the reduced keyboard image G3), the reduced keyboard image G3 can be moved. This prevents the displaying of an originally-displayed screen from becoming difficult to view.

As described above, in this embodiment, while the keyboard 8 is connected to the connection portion 7, the display portion (liquid crystal display portion 11) displays the keyboard image G1 or the reduced keyboard image G3, and performs the displaying of the disabled keys. In other words, while the keyboard 8 is connected to the connection portion 7, the control portion 6 causes the display portion to display the keyboard image G1 or the reduced keyboard image G3, and causes the display portion to perform the displaying of the disabled keys. This enables the user to check the disabled keys at any time when performing an input on the keyboard 8. Therefore, the user can perform an input while checking which key of the keyboard 8 is disabled. Further, the user can learn quickly which key is disabled.

Fourth Embodiment

Figure 15:
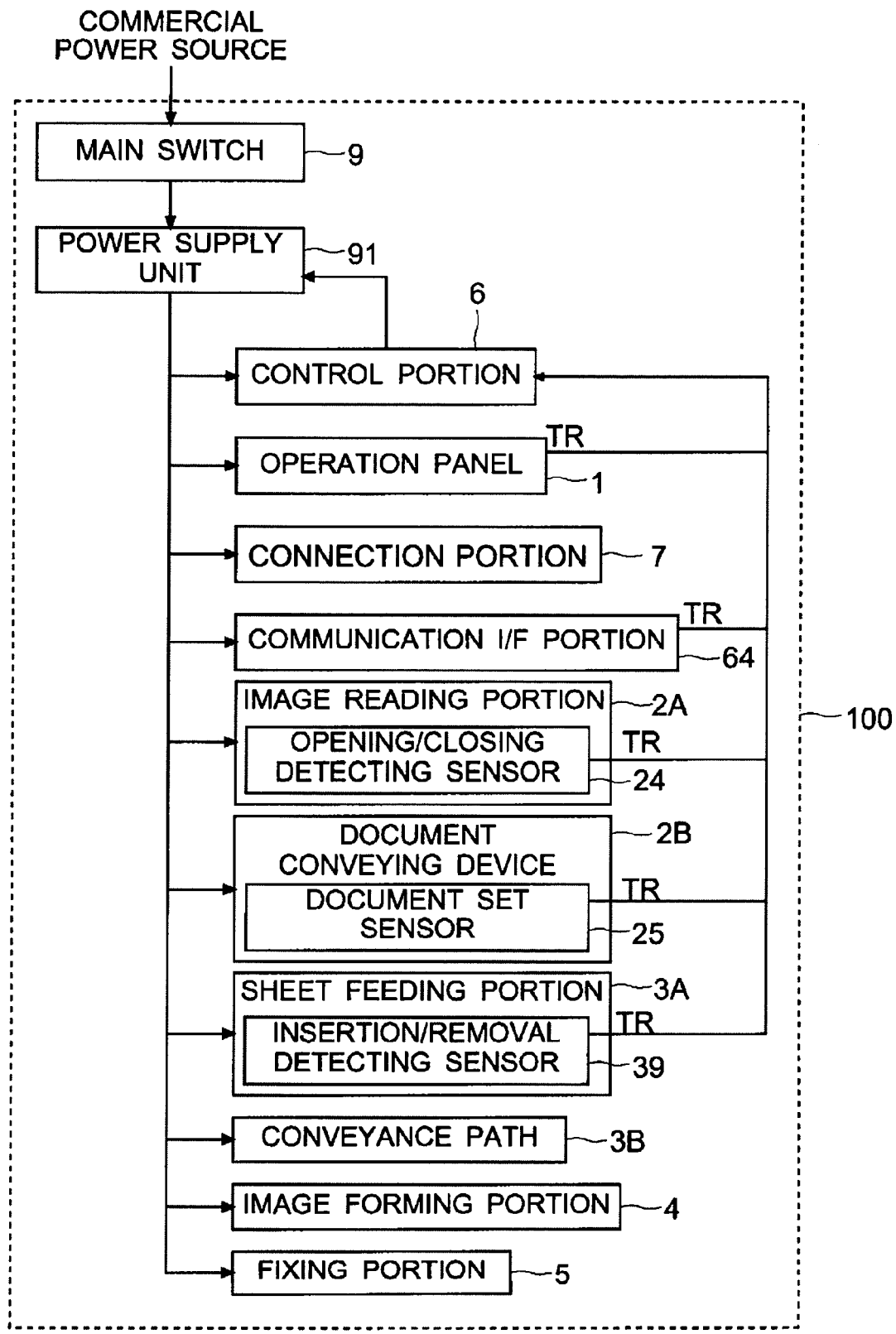
FIG. 15 is a block diagram illustrating an example of a power supply system used in a multifunction peripheral according to a fourth embodiment.
Figure 16:
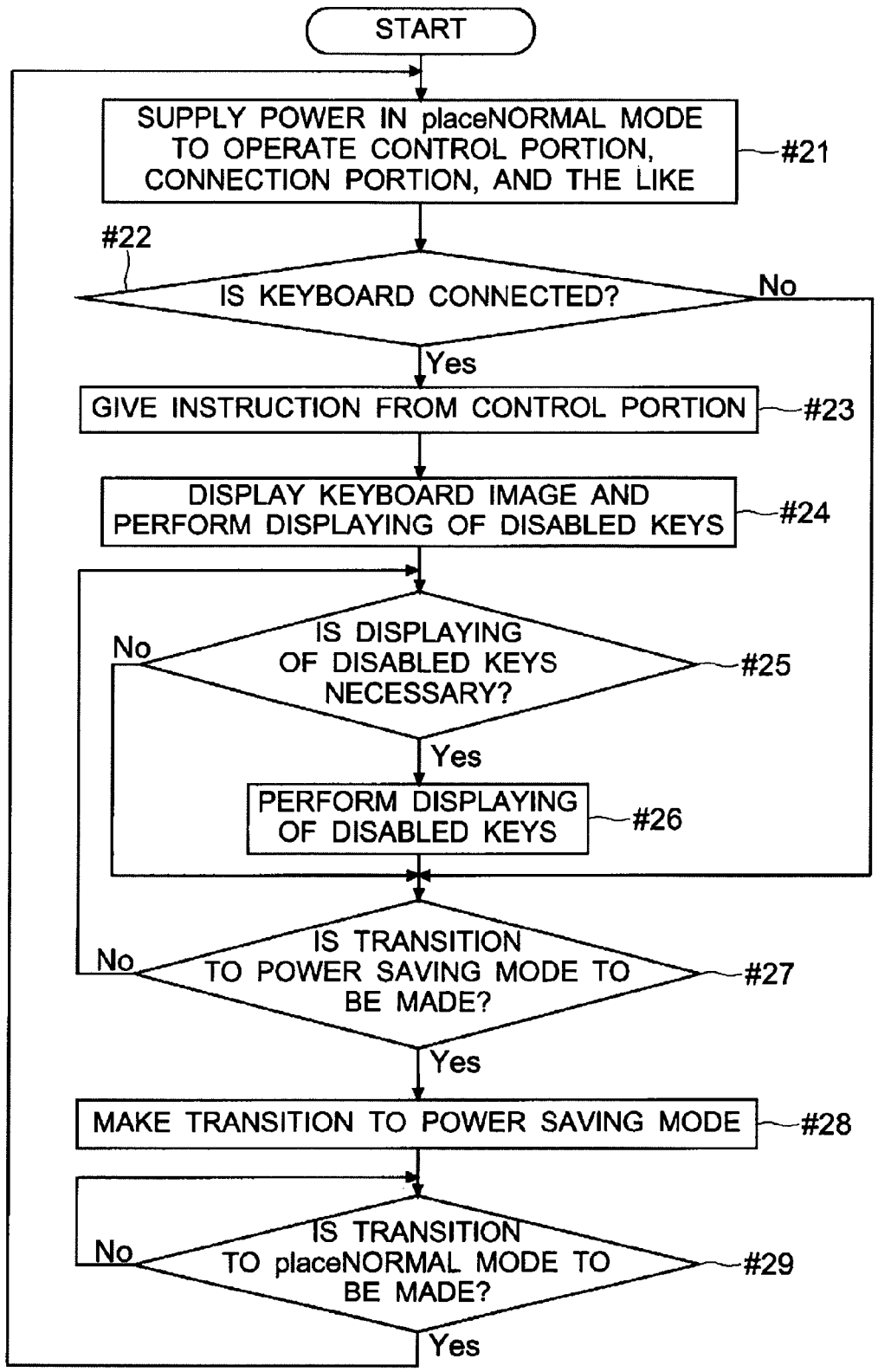
FIG. 16 is a flow chart illustrating an example of display control performed when the multifunction peripheral according to the fourth embodiment is started.

Next, referring to FIGS. 15 and 16, a fourth embodiment is described. FIG. 15 is a block diagram illustrating an example of a power supply system used in a multifunction peripheral 100 according to the fourth embodiment. FIG. 16 is a flow chart illustrating an example of display control performed when the multifunction peripheral 100 according to the fourth embodiment is started.

In the fourth embodiment, at the time of turning ON main power or recovering from a power saving mode, when the keyboard 8 is connected to the multifunction peripheral 100, the keyboard image G1 is displayed and the displaying of the disabled keys is performed for the purpose of, for example, notifying the user that the keyboard 8 is recognized.

First, description is given of power supply performed in the multifunction peripheral 100 of this embodiment. The multifunction peripheral 100 of this embodiment is provided with a main switch 9 for establishing and cutting off a connection between a commercial power source and the multifunction peripheral 100. For example, the main switch 9 is a mechanical switch provided on, for example, a side surface of the multifunction peripheral 100.

Then, when the main switch 9 is ON, a power supply unit 91 provided to the multifunction peripheral 100 becomes connected to the commercial power source. The power supply unit 91 includes, for example, a rectifier circuit, a transformer, and a power inverter circuit. The power supply unit 91 rectifies alternating current to generate a plurality of kinds of direct-current voltage. For example, the power supply unit 91 generates various voltages, such as a voltage for driving the control portion 6, a voltage for driving a liquid crystal panel of the liquid crystal display portion 11, and a voltage for rotating motors that cause various rotational bodies of the multifunction peripheral 100 to be rotated (for example, DC 24 V).

Power is supplied from the power supply unit 91 to the respective portions such as the control portion 6, the operation panel 1, the connection portion 7, the image forming portion 4, and the fixing portion 5. Thus, when the main power is turned ON by the main switch 9, power is supplied to the control portion 6, the connection portion 7, the operation panel 1, and the like, which are then sequentially started. Further, in this embodiment, at the time of the start-up, when the keyboard 8 is connected to the connection portion 7, the keyboard image G1 is displayed and the displaying of the disabled keys is performed.

Further, the multifunction peripheral 100 of this embodiment is provided with the power saving mode. The power saving mode is a mode in which power consumed by the multifunction peripheral 100 is reduced compared to the power consumed in a normal mode. Here, the normal mode is described. In the normal mode, the multifunction peripheral 100 is in a state of being ready for immediate use, and the respective portions of the multifunction peripheral 100 are in a state of being supplied with power.

However, in the normal mode, the fixing portion 5 is kept at such a temperature as to enable fixing (for example, about 180° C.), and the liquid crystal display portion 11 of the operation panel 1 also performs some display, such as a standby screen. As can be seen from the above, in the normal mode, a given amount of power is consumed.

In view of the above, in the multifunction peripheral 100 of this embodiment, for example, when a predetermined power saving mode transition time period has elapsed after an input to the multifunction peripheral 100 (for example, an input to the operation panel 1, a data input to the communication I/F portion 64, or the like) ceased to be received, the control portion 6 instructs the power supply unit 91 to make transition to the power saving mode. When the transition to the power saving mode is completed, in principle, the power supply unit 91 suspends power supply to the portions of the multifunction peripheral 100 except the control portion 6.

However, when the user desires to use the multifunction peripheral 100 or when printing or the like needs to be performed, it is necessary to resume power supply to the respective portions of the multifunction peripheral 100 so as to recover from the power saving mode to the normal mode. The multifunction peripheral 100 is provided with parts (operation detecting portions) for detecting an operation or input to the multifunction peripheral 100 and issuing a trigger signal TR to cause recovery from the power saving mode to the normal mode. Note that, even in the power saving mode, power is supplied to the control portion 6 and the parts for issuing the trigger signal TR.

For example, among the operation detecting portions is the operation panel 1 (corresponding to the operation detecting portion). For example, when any one of the keys has been pressed on the operation panel 1, the operation panel 1 issues the trigger signal TR. Further, among the operation detecting portions is the communication I/F portion 64 (corresponding to the operation detecting portion). For example, when print data for the printer has been received from the external computer 200, or when data has been received from a communication partner's fax machine 300, the communication I/F portion 64 issues the trigger signal TR, to thereby cause the multifunction peripheral 100 to recover to a state of being able to perform printing or the like.

Further, for example, the operation detecting portion may be provided to the image reading portion 2A. For example, the image reading portion 2A is provided with an opening/closing detecting sensor 24 (corresponding to the operation detecting portion) for detecting the opening/closing of the document conveying device 2B. The output from the opening/closing detecting sensor 24 is changed in accordance with the opening/closing of the document conveying device 2B. The opening/closing detecting sensor 24 may be of mechanical type or of optical type, and only needs to detect that the opening/closing has occurred. By the way, the opening/closing of the document conveying device 2B is performed by the user for copying or scanning. Thus, the opening/closing detecting sensor 24 issues the trigger signal TR, to thereby cause the multifunction peripheral 100 to recover to the state of being able to perform printing or the like.

Further, for example, the operation detecting portion may be provided to the document conveying device 2B. For example, the document conveying device 2B is provided with a document set sensor 25 (corresponding to the operation detecting portion) for detecting whether or not a document is placed on the document tray 21. The output from the document set sensor 25 is changed in accordance with whether or not a document is placed. The document set sensor 25 may be of mechanical type or of optical type, and only needs to detect that a document has been set. By the way, a document is set by the user for copying or scanning. Thus, the document set sensor 25 issues the trigger signal TR, to thereby cause the multifunction peripheral 100 to recover to the state of being able to perform printing or the like.

Further, for example, the operation detecting portion may be provided to the sheet feeding portion 3A. For example, the sheet feeding portion 3A is provided with an insertion/removal detecting sensor 39 (corresponding to the operation detecting portion) for detecting the insertion/removal of the sheet feeding portion 3A. The output from the insertion/removal detecting sensor 39 is changed in accordance with the insertion/removal of the sheet feeding portion 3A. The insertion/removal detecting sensor 39 may be of mechanical type or of optical type, and only needs to detect that the removal and insertion have occurred. By the way, the removal and insertion of the sheet feeding portion 3A are performed when the user adds sheets or changes the sheet size, and thus can be regarded as an operation performed with respect to the multifunction peripheral 100. Thus, the insertion/removal detecting sensor 39 issues the trigger signal TR, to thereby cause the multifunction peripheral 100 to recover to the state of being able to perform printing or the like.

Note that, places other than the above-mentioned portions may be provided with the operation detecting portion for issuing the trigger signal TR that causes the recovery from the power saving mode to the normal mode. Then, the trigger signal TR output from each operation detecting portion is input to the control portion 6. When the trigger signal TR has been input, the control portion 6 gives an instruction to the power supply unit 91 so as to resume power supply to the respective portions. With this, the multifunction peripheral 100 recovers from the power saving mode to the normal mode. Then, in this embodiment, at the time of recovering from the power saving mode to the normal mode, when the keyboard 8 is connected to the connection portion 7, the keyboard image G1 is displayed and the displaying of the disabled keys is performed.

Here, referring to FIG. 16, a flow of control is described. First, FIG. 16 illustrates a time point at which the main switch 9 has been turned ON. In other words, FIG. 16 illustrates a time point at which the main power of the multifunction peripheral 100 has been turned ON. Then, the power supply is performed in the normal mode, and the control portion 6, the connection portion 7, and the like are started and operate (Step #21). After that, the connection portion 7 checks whether or not the keyboard 8 is connected (Step #22).

When the keyboard 8 is connected (Yes in Step #22), in response to a notification from the connection portion 7, the control portion 6 instructs the display control portion 10 to display the keyboard image G1 and perform the displaying of the disabled keys (Step #23). As a result, the liquid crystal display portion 11 displays the keyboard image G1 and also performs the displaying of the disabled keys (Step #24).

Subsequently, as described in the first to third embodiments, the control portion 6 checks whether or not there is a need to perform the displaying of the disabled keys (Step #25). Then, when there is a need to perform the displaying of the disabled keys (Yes in Step #25), the liquid crystal display portion 11 is caused to perform the displaying of the disabled keys (Step #26). In other words, before the transition to the power saving mode, the displaying of the disabled keys is performed as needed.

On the other hand, when the keyboard 8 is not connected (No in Step #23), or when the disabled keys do not need to be displayed (No in Step #25), the control portion 6 checks whether or not a condition for making transition to the power saving mode is satisfied, to thereby determine to make transition to the power saving mode (Step #27).

When the transition to the power saving mode is to be made (Yes in Step #27), the control portion 6 gives an instruction to the power supply unit 91 so as to make transition to the power saving mode (Step #28). On the other hand, when the transition to the power saving mode is not to be made, for example, the processing returns to Step #25.

Then, after the transition to the power saving mode is made, the control portion 6 checks whether or not the trigger signal TR has been input from each operation detecting portion, to thereby determine to make recovery to the normal mode (Step #29). When the recovery to the normal mode is to be made (Yes in Step #29), the processing returns to Step #21. With this, at the time of turning ON the main power or recovering from the power saving mode to the normal mode, when the keyboard 8 is connected to the connection portion 7, the liquid crystal display portion 11 displays the keyboard image G1 and performs the displaying of the disabled keys. On the other hand, when the power saving mode is to be maintained (No in Step #29), the control portion 6 continues the examination of Step #29 (loop of Step #29). Thus, the power saving mode is maintained.

As described above, the multifunction peripheral 100 (the image forming apparatus) of this embodiment includes the main switch 9 for turning ON the main power of the image forming apparatus, and after the power of the image forming apparatus is turned ON by the main switch 9 to start the display portion (liquid crystal display portion 11) and the connection portion 7, the display portion performs the displaying of the disabled keys when the keyboard 8 is connected to the connection portion 7. In other words, the image forming apparatus (for example, multifunction peripheral 100) includes the main switch 9 for turning ON the main power of the image forming apparatus, and after the power of the image forming apparatus is turned ON by the main switch 9 to start the control portion 6 and the connection portion 7, the control portion 6 causes the display portion to perform the displaying of the disabled keys when the keyboard 8 is connected to the connection portion 7. With this configuration, the displaying of the disabled keys is performed when the image forming apparatus is started, and hence it is possible to notify the user of the positions of the disabled keys before an input using the keyboard 8 is performed.

Further, the multifunction peripheral 100 includes: the operation detecting portion (the opening/closing detecting sensor 24, the document set sensor 25, the insertion/removal detecting sensor 39, or the communication I/F portion 64) for detecting that an operation is performed with respect to the image forming apparatus; the power saving mode in which the power supply to the connection portion 7 and the display portion (liquid crystal display portion 11) is suspended when the predetermined power saving mode transition time period has elapsed with the operation detecting portion detecting no operation with respect to the image forming apparatus; and the normal mode in which the power supply to the connection portion 7 and the display portion is resumed when the operation detecting portion detects that an operation is performed with respect to the image forming apparatus in the power saving mode, and, in the case of recovery to the normal mode, the display portion performs the displaying of the disabled keys when the keyboard 8 is connected to the connection portion 7. In other words, further, the operation detecting portion for detecting that an operation is performed with respect to the image forming apparatus (for example, multifunction peripheral 100) is provided, and the control portion 6 is configured to: suspend the power supply to the connection portion 7 and the display portion when the predetermined power saving mode transition time period has elapsed with the operation detecting portion detecting no operation with respect to the image forming apparatus, thereby causing the image forming apparatus to make transition to the power saving mode; when the operation detecting portion detects that an operation is performed with respect to the image forming apparatus in the power saving mode, resume the power supply to the connection portion 7 and the display portion, thereby making recovery to the normal mode; and in the case of the recovery to the normal mode, cause the display portion to perform the displaying of the disabled keys when the keyboard 8 is connected to the connection portion 7. With this configuration, the displaying of the disabled keys is performed when the image forming apparatus is used again, and hence it is possible to notify the user of the positions of the disabled keys before an input using the keyboard 8 is performed.

The embodiments of the present invention have been described, but the scope of the present invention is not limited thereto. The present invention may be implemented by making various modifications thereto without departing from the gist of the present invention.

What is claimed is:

1. An image forming apparatus, comprising:
    a connection portion to be connected to a keyboard, for performing communication with the keyboard;
    a display portion for performing displaying of disabled keys by displaying, when the keyboard is connected to the connection portion, a keyboard image representing the keyboard connected to the connection portion to show, within the keyboard image, usable keys and the disabled keys, which are unusable keys among keys provided to the keyboard, so as to indicate parts of the keyboard image corresponding to the disabled keys as the unusable keys; and
    an input portion for accepting input, wherein
    the input portion accepts input determining an actual count of times the disabled keys have been pressed or a count of the times the disabled keys have been pressed per unit time, and
    the display portion performs the displaying of the disabled keys when a count of times the disabled keys have been pressed exceeds a predetermined value of the actual count or the count of times the disabled keys have been pressed per unit time.

2. An image forming apparatus according to claim 1, wherein, at the time of the displaying of the disabled keys, the display portion performs modified displaying on the disabled keys within the keyboard image, thereby performing the displaying of the disabled keys.

3. An image forming apparatus according to claim 2, wherein the display portion performs the modified displaying by using hatching and/or changing a display color.

4. An image forming apparatus according to claim 1, wherein the display portion performs the displaying of the disabled keys when one of the disabled keys is pressed on the keyboard.

5. An image forming apparatus according to claim 1, wherein the display portion performs the displaying of the disabled keys for a predetermined display time period.

6. An image forming apparatus according to claim 1, further comprising an input portion for receiving an input made by pressing the display portion, the input portion receiving an input of a key pressed on the keyboard image displayed on the display portion.

7. An image forming apparatus according to claim 1, wherein the display portion displays the keyboard image and performs the displaying of the disabled keys while the keyboard is connected to the connection portion.

8. An image forming apparatus according to claim 1, further comprising a main switch for turning ON main power of the image forming apparatus, wherein, after the main power of the image forming apparatus is turned ON by the main switch to start the display portion and the connection portion, the display portion performs the displaying of the disabled keys when the keyboard is connected to the connection portion.

9. An image forming apparatus according to claim 1, further comprising: an operation detecting portion for detecting that an operation is performed with respect to the image forming apparatus; a power saving mode in which power supply to the connection portion and the display portion is suspended when a predetermined power saving mode transition time period has elapsed with the operation detecting portion detecting no operation with respect to the image forming apparatus; and a normal mode in which the power supply to the connection portion and the display portion is resumed when the operation detecting portion detects that an operation is performed with respect to the image forming apparatus in the power saving mode, wherein, in a case of recovery to the normal mode, the display portion performs the displaying of the disabled keys when the keyboard is connected to the connection portion.

10. A display method for a display portion of an image forming apparatus, comprising:
    connecting a keyboard to a connection portion of the image forming apparatus;
    performing, by the connection portion, communication with the keyboard;
    performing displaying of disabled keys by displaying, when the keyboard is connected to the connection portion, a keyboard image representing the keyboard connected to the connection portion to show, within the keyboard image, usable keys and the disabled keys, which are unusable keys among keys provided to the keyboard, so as to indicate parts of the keyboard image corresponding to the disabled keys as the unusable keys; and
    accepting input for an input portion, wherein the input portion accepts input determining an actual count of the times the disable keys have been pressed or a count of the times the disabled keys have been pressed per unit time and the display portion performs the displaying of the disabled keys when the count of times one of the disabled keys is pressed exceeds a predetermined value of the actual count or the count of the times the disabled keys have been pressed per unit time.

11. A display method for a display portion of an image forming apparatus according to claim 10, wherein the performing displaying of disabled keys comprises: at the time of the displaying of the disabled keys, performing modified displaying the disabled keys within the keyboard image, thereby performing the displaying of the disabled keys.

12. A display method for a display portion of an image forming apparatus according to claim 11, wherein the performing modified displaying comprises using hatching and/or changing a display color.

13. A display method for a display portion of an image forming apparatus according to claim 10, wherein the displaying of disabled keys is performed when one of the disabled keys is pressed on the keyboard.

14. A display method for a display portion of an image forming apparatus according to claim 10, wherein the displaying of disabled keys is performed for a predetermined display time period.

15. A display method for a display portion of an image forming apparatus according to claim 10, further comprising receiving, by an input portion for receiving an input made by pressing the display portion, an input of a key pressed on the keyboard image displayed on the display portion.

16. A display method for a display portion of an image forming apparatus according to claim 10, wherein the displaying a keyboard image and the displaying of disabled keys are performed by the display portion while the keyboard is connected to the connection portion.

17. A display method for a display portion of an image forming apparatus according to claim 10, the image forming apparatus comprising a main switch for turning ON main power of the image forming apparatus, wherein, after the main power of the image forming apparatus is turned ON by the main switch to start the display portion and the connection portion, the displaying of disabled keys is performed when the keyboard is connected to the connection portion.

18. A display method for a display portion of an image forming apparatus according to claim 10, further comprising: detecting, by an operation detecting portion, that an operation is performed with respect to the image forming apparatus; making transition to a power saving mode in which power supply to the connection portion and the display portion is suspended when a predetermined power saving mode transition time period has elapsed with the operation detecting portion detecting no operation with respect to the image forming apparatus; and making transition to a normal mode in which the power supply to the connection portion and the display portion is resumed when the operation detecting portion detects that an operation is performed with respect to the image forming apparatus in the power saving mode, wherein, in a case of recovery to the normal mode, the performing displaying of disabled keys is performed when the keyboard is connected to the connection portion.

* * * * *